(12) United States Patent
Marshall

(10) Patent No.: US 9,035,827 B2
(45) Date of Patent: May 19, 2015

(54) POSITIONING USING A LOCAL WAVE-PROPAGATION MODEL

(75) Inventor: Christopher Brian Marshall, Surrey (GB)

(73) Assignee: U-BLOX A.G., Thalwil (CH)

( * ) Notice: Subject to any disclaimer, the term of this patent is extended or adjusted under 35 U.S.C. 154(b) by 394 days.

(21) Appl. No.: 13/420,533

(22) Filed: Mar. 14, 2012

(65) Prior Publication Data
US 2013/0229303 A1  Sep. 5, 2013

(30) Foreign Application Priority Data

Mar. 2, 2012  (EP) ..................................... 12157996

(51) Int. Cl.
| G01S 19/48 | (2010.01) |
|---|---|
| G01S 5/02 | (2010.01) |
| G01S 5/00 | (2006.01) |
| G01S 5/10 | (2006.01) |
| G01S 5/12 | (2006.01) |
| G01S 19/46 | (2010.01) |

(52) U.S. Cl.
CPC ............... *G01S 5/0284* (2013.01); *G01S 19/46* (2013.01); *G01S 5/00* (2013.01); *G01S 5/0257* (2013.01); *G01S 5/10* (2013.01); *G01S 5/12* (2013.01)

(58) Field of Classification Search
CPC .......... G01S 19/48; G01S 19/51; G01S 19/52
USPC ............................ 342/357.31, 357.34, 357.35
See application file for complete search history.

(56) References Cited

U.S. PATENT DOCUMENTS

| 5,502,450 A | 3/1996 | Zablotney et al. |
|---|---|---|
| 6,492,945 B2 | 12/2002 | Counselman, III et al. |
| 6,658,258 B1 | 12/2003 | Chen et al. |
| 6,978,124 B2 | 12/2005 | Benes et al. |

(Continued)

FOREIGN PATENT DOCUMENTS

| EP | 0 437 822 A2 | 7/1991 |
|---|---|---|
| EP | 0 843 179 A1 | 5/1998 |

(Continued)

OTHER PUBLICATIONS

Miller, M. M. et al., "Navigating in Difficult Environments: Alternatives to GPS-2," *Low-Cost Navigation Sensors and integration Technology*, Sensors and Electronics Technology Panel (SET), RTO-EN-SET-116(2009), pp. 1-18, Mar. 2009.

(Continued)

*Primary Examiner* — Harry Liu
(74) *Attorney, Agent, or Firm* — Blakely Sokoloff Taylor & Zafman

(57) ABSTRACT

A method and apparatus for assisting the calculation of the position of a receiver device (1200), by observing a transmitted signal having a known structure. The method comprises: comparing (S220) the time of arrival, at a reference position ($X_1$), of a first portion of the signal with the time of arrival at the receiver, at an unknown position ($Y_1$), of a second portion of the signal; obtaining (S230) a local wave propagation model of the signal, the model comprising an estimate of the direction of propagation of the signal in the neighborhood of the reference position and unknown position; and using (S240) the direction of propagation and the result of the comparison to assist in the calculation of the unknown position relative to the reference position.

16 Claims, 12 Drawing Sheets

(56) References Cited

U.S. PATENT DOCUMENTS

| | | | |
|---|---|---|---|
| 7,598,911 | B2 | 10/2009 | Marinier |
| 7,831,341 | B2 | 11/2010 | Sheikh |
| 8,018,383 | B1 | 9/2011 | Schantz et al. |
| 8,050,687 | B2 * | 11/2011 | Duffett-Smith et al. ... 455/456.1 |
| 8,072,383 | B1 | 12/2011 | Martin et al. |
| 8,396,268 | B2 * | 3/2013 | Zabair et al. .................. 382/128 |
| 2008/0100502 | A1 | 5/2008 | Jantunen et al. |
| 2009/0131076 | A1 | 5/2009 | Moeglein et al. |
| 2010/0302102 | A1 | 12/2010 | Desai et al. |
| 2010/0309048 | A1 | 12/2010 | Polisetty et al. |
| 2010/0311440 | A1 | 12/2010 | Rakanovic et al. |
| 2011/0140966 | A1 | 6/2011 | Ferreol et al. |

FOREIGN PATENT DOCUMENTS

| | | |
|---|---|---|
| EP | 2327994 | 6/2011 |
| WO | WO 2008/085532 | 7/2008 |
| WO | WO 2011/042726 | 4/2011 |
| WO | WO 2011/146011 | 11/2011 |
| WO | WO 2011/149781 | 12/2011 |

OTHER PUBLICATIONS

Michael Robinson, et al., Topological Localization via Signals of Opportunity, IEEE Transactions on Signal Processing, Feb. 2012.

Raquet, J., et al., "Non-GNSS Radio Frequency Navigation," IEEE International Conference on Acoustics, Speech and Signal Processing, Piscataway, New Jersey, Mar. 31, 2008, pp. 5308-5311, XP031251800.

Thomas Locher, et al., Received-Signal-Strength-Based Logical Positioning Resilient to Signal Fluctuation, 2005, IEEE Computer Society, Washington, DC, USA.

Thomas Callaghan, et al., Correlation-Based Radio Localization in an Indoor Environment, EURASIP Journal on Wireless Communications and Networking, 2011, http://jwcn.eurasipjournals.com/content/2011/1/135.

Michael Robinson, et al., Topological Localization via Signals of Opportunity, IEEE Transactions on Signal Processing, May 2012.

Chen Sun, et al., Direction of Arrival Estimation Based on a Single Port Smart Antenna Using MUSIC Algorithm with Periodic Signals, World Academy of Science, Engineering and Technology 11, 2005.

Tolga Eren, Using Angle of Arrival (Bearing) Information for Localization in Robot Networks, Turk J Elec Engin, vol. 15, No. 2, 2007.

Bryan N. Hood, et al., Estimating DoA From Radio-Frequency RSSI Measurements Using an Actuated Reflector, IEEE Sensors Journal, vol. 11, No. 2, Feb. 2011.

Dragos Niculescu, et al., Ad Hoc Positioning System (APS) Using AOA, IEEE Infocom 2003.

Rong Peng, et al., Angle of Arrival Localization for Wireless Sensor Networks, IEEE Secon 2006.

Abbas H. Kazmi, et al., Effect of Scattering around BS on the Spatial Statistics of Mobile Channel in Macrocell Environment, 2010.

Ali Abdi, et al., A Parametric Model for the Distribution of the Angle of Arrival and the Associated Correlation Function and Power Spectrum at the Mobile Station, IEEE Transactions on Vehicular Technology, vol. 51, No. 3, May 2002.

Panarat Cherntanomwong, et al., Signal Subspace Interpolation from Discrete Measurement Samples in Constructing a Database for Location Fingerprint Technique, IEICE Trans. Commun., vol. E92-B, No. 9, Sep. 2009.

Richard K. Martin, et al., Bandwidth Efficient Cooperative TDOA Computation for Multicarrier Signals of Opportunity, IEEE Transactions on Signal Processing, vol. 57, No. 6, Jun. 2009.

Ofer Bar-Shalom, et al., Direct Position Determination of OFDM Signals, 2007 IEEE.

Dr. Chun Yang, et al., Self-Calibrating Position Location Using Signals of Opportunity, 22nd International Meeting of the Satellite Division of The Institute of Navigation, Savannah, GA, Sep. 22-25, 2009.

D. Palmer, et al., Non-GNSS Radio Positioning Using the Digital Audio Broadcasting (DAB) Signal, Proceedings of the 22nd International Technical Meeting of the Satellite Division of the Institute of Navigation (ION GNSS 2009), Savannah, GA, USA, Sep. 2009.

Michael B. Matthews, et al., SCP Enabled Navigation Using Signals of Opportunity in GPS Obstructed Environments, Navigation: Journal of the Institute of Navigation, Summer 2011, vol. 58, No. 2, pp. 91-110.

Damien Serant, et al., The Digital TV Case-Positioning Using Signals-of-Opportunity Based on OFDM Modulation, InsideGNSS, Nov./Dec. 2011.

Manh Hung V. Le, et al., Indoor Navigation System for Handheld Devices, Oct. 22, 2009.

Maniesh Kulshrestha, Locations; Because Life Moves Adding Location to Intelligence, Presented to Geointelligence Conference, Jul. 27-28, 2009, Presentation slides retrieved from: http://www.gisdevelopment.net/proceedings/Geointelligence/2009/geoint09_ManieshKulshrestha.pps.

* cited by examiner

POSITIONING USING A LOCAL WAVE-PROPAGATION MODEL

This invention relates to a method and apparatus for determining (or helping to determine) the position of a receiver device, by observing signals available in the local environment. These signals are not necessarily intended for providing a positioning function. Such signals are sometimes termed "Signals of Opportunity" ("SoOps") in the art. It is particularly relevant to assisting a satellite positioning receiver to determine its position when satellite reception is weak or unavailable.

The use of SoOps for positioning is known. However, in existing systems the locations of the transmitters are either known accurately in advance, or must be estimated accurately as part of the method. The accuracy of the estimation of the position of the receiving device is then sensitive to the accuracy of the known or estimated transmitter location. Also, in many cases, the usefulness of the positioning system is dependent upon obtaining (and maintaining) a database of precise transmitter locations.

An example of one such method is disclosed in WO 2011/042726. When a mobile receiver is at a first, known position, a virtual reference is established by logging the known position together with a local time at which a first instance of a code-word is received from a terrestrial radio signal transmitter, located at a known position. When the mobile receiver is at a second, unknown position, the local clock is used to determine the time difference between when the virtual positioning reference is predicted to receive a second instance of the code-word and when the mobile receiver actually receives that instance of the code-word. This allows the receiver to calculate its distance at the unknown position from the transmitter. By using the first, known position as a virtual reference, there is no need to establish the offsets i) between the transmitter and some arbitrary timing reference (for example, UTC), or ii) between the receiver and the same reference. Instead, the transmitter-receiver timing relationship is established directly by the reference measurement at the known distance between the transmitter and the receiver device.

According to an aspect of the present invention, there is provided a method of assisting the calculation of the position of a receiver device, by observing a transmitted signal having a known structure, the method comprising:

comparing the time of arrival, at a reference position, of a first portion of the signal with the time of arrival at the receiver, at an unknown position, of second portion of the signal;

obtaining a local wave propagation model of the signal, the model comprising an estimate of the direction of propagation of the signal in the neighbourhood of the reference position and unknown position; and using
the direction of propagation and
the result of the comparison
to assist in the calculation of the unknown position relative to the reference position.

The present inventors have recognised that the reliance upon knowledge of the transmitter location is a significant practical obstacle to the use of signals of opportunity for positioning. Firstly, it limits the number of signals that can be used for positioning (since signals can only be used if they can be identified and associated with a known transmitter location). This may necessitate an extensive database of transmitters and their respective locations. Even when a signal is identifiable and an explicit transmitter location is available, any error in the location will produce an error in the calculation of the unknown position. Furthermore, when the position of the receiver is calculated relative to the known, actual location of the transmitter, any reflections or other distortions in the speed and direction of travel of the signal as it propagates over the distance from the transmitter to the receiver device will give rise to systematic errors. This is because the calculations assume a direct (straight-line) path between the transmitter and receiver and the path actually travelled may be longer due to reflection. Similarly, distortion, or slowing of the signal may change the time of flight unpredictably. For example, signals may propagate at different speeds depending upon the properties of the medium through which they are travelling. Thus, propagation over seawater may be at a different speed from propagation over land.

The present inventors have also recognised that the reliance upon known transmitter locations can be avoided through the use of a local model of wave propagation. This model describes only how the signal travels in the local neighbourhood that is of interest. Therefore, the present method allows a SoOp to be used without needing to know accurately or to estimate accurately the transmitter location. Only local reference positions need be used in the position calculation. Therefore, inaccurately reported transmitter locations cannot cause errors. Moreover, reflected signals can be used successfully in the positioning method, provided that the propagation of the reflected signal is consistent throughout the neighbourhood of interest.

The position of the transmitter may be unknown. Furthermore, the unknown position is preferably calculated without reference to the position of the transmitter (even when the position of the transmitter is explicitly available). Note that the step of assisting the calculation of the unknown position relative to the reference position may comprise calculating a distance, along a direction of wave propagation, between the reference position and a contour or locus of positions upon which the unknown position lies. For example, if the signal is modelled as a planar wave, characterised by its propagation direction, then assisting the calculation of the unknown position may comprise calculating a displacement parallel to that direction of propagation.

In general the first and second signal portions may be the same portion or different portions of the signal. If they are the same portion of the signal, the signals may be received by different pieces of physical hardware at the reference and unknown positions. If they are different portions of the signal they may be received either by different devices or by a single receiver, which has moved from one position to the other.

The local wave propagation model describes how a wavefront of the signal behaves or evolves, in the local neighbourhood. The model characterises how the radio waves making up the signal propagate in the region of the reference position (s). Here, a "wavefront" refers to the locus of positions at which (each portion of) the signal arrives simultaneously. For 2D positioning, this locus will be a line (either straight or curved). In 3D, the locus will be a surface or shell (likewise, either plane or convex).

Only the "local" wavefront needs to be modelled that is, the wavefront in the neighbourhood of the position(s) being used as reference point(s). This will provide adequate accuracy for position determination in this neighbourhood. Note that the local propagation model might be established or defined at a unique position within the neighbourhood. However, in general it is not essential that this should be identical to the reference position that is used in the estimation of the unknown position. It is also intended that the local wave propagation model should characterise the evolution of the signal not just at a unique point, but over a finite local area that is, throughout the neighbourhood within which it is desired to estimate position.

The structure of a signal used in the method should be known in the sense that it should be possible to determine the relative times of transmission of different parts of the signal. The determination could be made before or after the respective parts of the signal have been received. A determination (prediction) may be made beforehand if, for example, the signal comprises a regular repetitive structure with a known period of repetition. In practice, the structures of many types of signals are known from technical standards. However, a repetitive structure could also become known to the receiver by observation of the signal over a sufficiently long interval, wherein the receiver learns the structure of the signal—for example, an identifiable periodicity or repetition in the signal or its contents. In other cases, the determination may be made after reception. For example, some signals of opportunity may incorporate an explicit time stamp, indicating the time instant (as determined at the transmitter) when the corresponding part of the signal was transmitted. In this case, the relative times of transmission of different parts of the signal can be determined by decoding and comparing their time stamps. In all cases, it is assumed that the clock in the transmitter is reasonably accurate or stable over the timescales involved. Inaccuracy in the transmitter clock may affect the accuracy of the position calculation (unless this inaccuracy can itself by characterised reliably).

In some embodiments, comparing the times of arrival comprises measuring a first time difference between them.

It may not be necessary to determine the absolute timing of each portion of the signal—that is, to record a time-stamp of its time of arrival according to some clock (for example, a UTC time-stamp). In some cases, the first time difference may be measured by recording the time of arrival of the first portion of the signal (as measured by a clock); recording the time of arrival of the second portion (measured by the same or another synchronised clock); and subtracting one time-stamp from the other. However, this is not essential. In other cases, the first time difference could be measured by starting a timer when the first portion arrives and stopping it when the second portion arrives. This may comprise, for example, counting a number of elapses clock cycles. In general, it is desirable that the means for measuring the time difference is accurate or stable. Any error in the differential measurement may cause an error in the later position calculations.

In still other embodiments, the comparison between the times of arrival may be implicit. For example, the comparison may comprise solving a system of one or more equations in which the times of arrival are variables.

In various embodiments, the comparison may be made between times of arrival as determined by any convenient timing means and frame of reference. For example, the comparison may be as measured by a clock on the receiver device, or as indicated by the satellite timings of signals received from GNSS satellites locked to UTC.

Note that although the goal of the method summarised above is to estimate the unknown position relative to the reference position, the position coordinates that are then actually reported might use a different frame of reference. That is, the position estimated relative to the reference position may be an intermediate variable for calculating the position relative to some other datum. This additional step relies on knowing the relationship between the reference position defined above and this other datum.

According to a related aspect of the invention there is provided a method of assisting the calculation of the position of a receiver device, by observing a transmitted signal having a known structure, the method comprising:

measuring a first time of arrival, at a reference position, of a first portion of the signal;

measuring a second time of arrival at the receiver, at an unknown position, of a second portion of the signal;

obtaining a local wave propagation model of the signal, the model comprising an estimate of the direction of propagation of the signal in the neighbourhood of the reference position and unknown position; and using
the direction of propagation;
the measured first time of arrival; and
the measured second time of arrival,
to assist in the calculation of the unknown position relative to the reference position.

The step of assisting the calculation of the unknown position optionally comprises comparing (more particularly, calculating a difference between) the first and second times of arrival. Alternatively, or in addition, the step may comprise solving one or more equations in which the first and second times of arrival are known variables. This may comprise implicit comparison of the first and second times of arrival.

The step of obtaining the direction of propagation of the signal optionally comprises: a second comparison, between the time of arrival, at a first position, of a third portion of the signal and the time of arrival, at a second different position, of a fourth portion of the signal, wherein a displacement vector between these two positions is known; and estimating the direction of arrival of the signal based on the displacement vector and the result of the second comparison.

Comparing the times of arrival of the third and fourth portions may comprise measuring a second time difference between these events. Alternatively, it may involve an implicit comparison in which one or more equations are solved, which include these times of arrival as variables.

This provides one advantageous way to measure the direction of propagation of the signal in the neighbourhood, without additional equipment or additional externally provided information.

Preferably the first and second positions are known. This allows the direction of arrival of the signal to be estimated in absolute terms. However, even if the first and second positions are not known in any external frame of reference, the direction of arrival of the signal can still be estimated relative to the displacement vector between them. This may be of use in applications where an unknown position only needs to be determined relative to the first and second positions—not in an external coordinate system.

Note that all of the first, second, third and fourth signal portions may be the same or different portions and may be received using the same or different hardware. Optionally, the first or second position may be the reference position.

In some embodiments, estimating the direction of arrival may comprise estimating two or more hypotheses (possible directions of arrival) that are consistent with the observed times of arrival.

The method may further comprise: a third comparison between the time of arrival, at a third position of a fifth portion of the signal and the time of arrival, at the first or second position, of the third or fourth portion, respectively, wherein a displacement vector between the third position and the respective one of the first and second positions is known; and at least one of: (i) estimating a curvature parameter of the local wave propagation model; (ii) resolving which of a plurality of hypotheses about the direction of arrival is true; and (iii) refining a single hypothesis about the direction of arrival, based on the results of the second and third comparisons and the relative displacements among the first, second, and third positions.

By comparing the times of arrival of three portions of the signal in three different locations, additional information can be obtained. In some embodiments this may include estimating not only the direction of propagation of the waves, but also a curvature parameter of the wavefront. This can allow a more accurate model of wave propagation to be constructed, which can enable more accurate positioning calculations. The first, second, and third positions should be different. Preferably, they are not collinear, so that they form a triangle of non-zero area. In other embodiments, the additional measurement or measurements can be used to resolve ambiguity. For example, if the direction of propagation of a wave is estimated using observations at only the first and second positions, and no other information is available, then the correct direction could be either of two directions that are symmetric about a line connecting the first and second positions. The measurement at the third position can resolve this ambiguity (provided the third position is no collinear with the first and second). In still other embodiments, the accuracy of a direction estimate may be improved by taking the additional measure ent into account for example by averaging or curve-fitting techniques.

As above for the first and second comparisons, the third comparison may be performed explicitly, by measuring or calculating a time difference, or implicitly, by solving one or more equations in which the variables appear.

The step of obtaining the direction of propagation of the signal may alternatively comprise: obtaining an estimate of the location of the transmitter of the signal; obtaining an estimate of a position in the neighbourhood of the reference position and the unknown position; comparing the estimated transmitter location with the estimated neighbourhood position; and estimating the direction of propagation of the signal based on the result of the comparison.

Here, the vector leading from the transmitter location to the neighbourhood of interest is assumed to describe the direction of propagation of the signal in the neighbourhood. This assumption will be valid for uninterrupted transmission in free space, without reflections.

This approach may use a database of known transmitter locations to establish the transmitter location. However, note that this is only used to derive the direction of propagation of the signal in the local neighbourhood of the receiver. The calculation of the unknown position remains independent of the transmitter location, to a large extent. In particular, the calculation is independent of the distance between the transmitter and the unknown and/or reference locations. This means that the positioning accuracy is not influenced by errors in the transmitter location along the propagation vector, and is only weakly affected by errors in the orthogonal direction. The positioning accuracy is independent of the actual speed of travel and time of flight from the transmitter to the local neighbourhood of the receiver, because the transmitter is not being used as a reference position. The reference point for position information remains the (nearby) position from which the timing of the signal was determined.

As a still further alternative, the step of obtaining the direction of propagation of the signal may comprises: obtaining an estimate of a position in the neighbourhood of the reference position and the unknown position accessing a database describing a plurality of positions, wherein the database describes a direction of propagation of the signal for each of those positions; and retrieving from the database a direction of propagation of the signal for the estimated neighbourhood position.

In this approach, instead of exploiting knowledge of a transmitter location, a database is used which describes the direction of propagation of signals from that transmitter across a range of locations. This may be more accurate, because the actual observed direction of propagation at any given location may deviate from a simple linear model of radial ray propagation. This may occur because of obstruction, reflection, refraction, diffraction or any other propagation effects. A database of directions of arrival can accommodate these real observed variations, unlike a database of transmitter locations.

The step of assisting in the calculation of the unknown position preferably comprises: based on the first time difference, determining a locus of positions, within which the unknown position lies relative to the reference position.

The locus of positions may describe a line (either straight or curved, depending upon the assumptions of the wave propagation model) along which the unknown position lies. This line may be perpendicular to the direction of propagation of the signal at all points. That is, the locus of positions may lie parallel to a local wavefront of the signal. The line is thus a locus of positions at which the signal arrives simultaneously.

The method may further comprise combining the determined locus of positions with additional data, comprising one or more of: position information derived from measurements of global navigation satellite signals; position information derived from measurements of a further transmitted signal having a known structure; and information from an inertial positioning system.

In general, measurements from a single signal of opportunity will be insufficient to allow a unique position to be calculated. However, the measurements may be combined with other available sources of position information, in order to calculate a unique position (also known in the art as a "position fix").

One possibility is to use GNSS signals. Although too few satellite signals may be available at the unknown position to calculate a complete position fix, those satellite signals that are received successfully may be used to supplement (or be supplemented by) the position information derived from the signal of opportunity.

Another possibility is to use at least one further signal of opportunity for the same purpose. The further signal is preferably received from a direction different from that of the first transmitted signal of known structure. This independence of the two signals should allow a position to be calculated in a two-dimensional (2D) plane.

Still another possibility is an inertial positioning system. Such systems can provide an indication of relative displacement, for example by measuring forces due to acceleration. Most preferably, the inertial positioning system would be calibrated by a reliable position estimate (such as from a GNSS receiver) when possible.

Any two (or more) of these examples may be used in combination, to provide an additional source of positioning information, which can be combined with the observations of the signal of opportunity.

The combining step may be performed, for example, by extrapolation from all the information available. For example, when the invention is used with a GNSS receiver, there will typically be a history of position fixes available, prior to loss of satellite reception. In a simple example, a last known position and heading of the device could be derived from this history. The position of the device could then be estimated by the intersection of this vector with the locus of positions established by measurements of the SoOp. In a more advanced embodiment, the extrapolation may be performed by providing the information to be combined as input to a Kalman filter. The Kalman filter will be well known to those skilled in the art as a means of combining observations.

In general, information from (i) GNSS signals (ii) one or more signals of opportunity (iii) an inertial positioning system or (iv) any other source may be incorporated into the extrapolation either as part of the trajectory-history, or as observations which are used to determine an extrapolated new position, based on that history.

The local wave propagation may be modelled by a straight line.

In two dimensions, the wavefront can be approximated as a straight line. This may be particularly appropriate at relatively large distances from the transmitter, for operation of a small local area, or where an approximate position estimate is sufficient.

With a linear model, the parameters comprise a direction (angle of arrival) associated with a reference position, as well as a timing. The timing may be sufficiently specified by the first comparison mentioned above: that is, the explicit or implicit difference between the timing of the signal at the reference position and the timing of the signal at the unknown position. Note also that the model may include some ambiguity: for example, there may be two or more possible directions of propagation for the signal. Optionally, such ambiguity can be resolved by additional measurements of the signal at further reference locations (as summarised already above), or an estimate not necessarily precise of the transmitter location.

Alternatively, the local wave propagation may be modelled by a curve and the model may comprise a curvature parameter, wherein the curvature parameter is used in the step of assisting the calculation of the unknown position.

The wavefront or locus of position solutions can be modelled as an arc of a circle, for example (or a portion of a parabola or other curvilinear model). This may be more accurate, especially closer to the transmitter, if the transmitter is considered as a point source radiating over a range of angles. In general, measurements at more than two positions of known relative displacement will be necessary to estimate the parameters for a curved wavefront.

The reference position is preferably known, ore preferably having been determined using a satellite positioning system.

If the reference position is known in some external or absolute coordinate system (such as longitude and latitude) then the unknown position can also be determined in that frame of reference.

A Global Navigation Satellite System (GNSS), such as the Global Positioning System (GPS), can provide an accurate spatial reference position. It can also provide an accurate timing reference, useful for measuring the time difference between the arrival of parts of the signal in different locations. The use of satellite positioning to provide the reference positions can also complement the present position calculation method because, when satellite reception is unavailable, a reference position previously established by satellite positioning can be used in a method according to the present invention to determine absolute position.

The method may advantageously further comprise: measuring and/or comparing one or more times of arrival of additional portions of the signal at additional positions, and using the results of these measurements or comparisons for one or more of: (i) increasing accuracy or robustness by averaging measurements; (ii) resolving an ambiguity in the direction of propagation of the signal; (iii) estimating a curvature parameter for the wave propagation model; and (iv) estimating a drift in timing (timing drift/clock drift) of the transmitter of the signal.

Additional measurements may be used in different ways, depending upon the wave propagation model being used, the information available from other sources, assumptions about the signal and its transmitter. In general, the problem is to calculate some unknown variables, based on other known variables. These variables include the direction of propagation and curvature of the wavefront, each of the time differences discussed already above, and the timing drift of the transmitter. In general, the system of simultaneous equations can be solved if there are more observations (measurements) than unknowns. However, additional "redundant" measurements in excess of this minimum requirement are also desirable, to create an overdetermined system of equations and thereby increase the robustness and accuracy of the method.

One example of this may comprise making a fourth comparison between the time of arrival, at a fourth position, of a sixth portion of the signal and the time of arrival, at a fifth position, of a seventh portion of the signal, wherein a displacement vector between these two positions is known relative to the direction of propagation of the signal; and estimating a timing drift of the transmitter based on the result of the fourth comparison.

In particular, this example may comprise measuring a fourth time difference between the arrival, at the fourth position, of the sixth portion of the signal and the arrival, at the fifth position, of the seventh portion of the signal, calculating an expected time difference between the two arrivals, based on the known structure of the signal and the displacement vector; comparing the expected time difference with the measured fourth time difference; and estimating a timing drift of the transmitter based on the result of the comparison.

In this way, one or more additional measurements are used to determine the timing drift of the transmitter. Some terrestrial transmitters may be synchronised accurately to a reliable reference, such as UTC. However, other transmitters are not synchronised accurately. In particular, the clock at the transmitter may be running fast or slow. This means that the signal structure being relied upon to determine the position of the receiver may be transmitted faster or slower by the transmitter than expected. This introduces errors into the calculated geometry if it is not compensated for. It may therefore be beneficial to estimate the timing drift of the transmitter, by comparing the expected times of arrival of different parts of the signal with their actual times of arrival. Two measurements can be used to estimate the clock rate at the transmitter (which determines the rate at which the signal drifts from its expected timing at the receiver). Further measurements may be used to estimate higher-order errors for example, whether the transmitter clock is speeding up or slowing down, and at what rate. In theory the better the modelling of the transmitter's clock rate, the better the resulting position estimates can be.

Note that the fourth and fifth positions could be the same that is two measurements may be taken at the same location at different times. In this case it is very easy to predict the expected time difference between the sixth and seventh portions of the signal, because it depends only on the signal structure. If the fourth and fifth positions are different, the difference in position (displacement vector) between them will modify the anticipated times of arrival.

Note also that at least one of the fourth and fifth positions could be the reference position. Equally, one of the fourth and fifth positions could be the same as the first or second position (used to calculate the direction of propagation of the signal) or the third position (used to calculate the curvature of the signal wavefront). However, at least one of the fourth and fifth positions must be different from the first and second positions, in order to be able to calculate both the direction of arrival and the timing drift. Measurements at four different positions (at least) are needed if it is desired to calculate the direction, curvature, and timing drift together.

Preferably, the method comprises determining timing drift and direction of arrival of the signal jointly, by solving simultaneous equations.

In general the signals of opportunity used in the method should preferably have stable timing, or at least predictably varying timing. More particularly, the signals should exhibit predictable timing for the timescales over which the measurements are made. Unpredictable variations in the transmitter timing will lead to errors in the position calculations.

Suitable examples of signals include (but are not limited to) Terrestrial Digital Video Broadcasting (DVB-T) signals and second or third (or higher) generation cellular communications base-stations that are based on Code-Division Multiple Access (CDMA) signals. The transmitters for these services exhibit consistently accurate timing. The transmitter of a signal used in the method is preferably terrestrial. The transmitter may have a fixed location or at least its location may be static for an interval in which the measurements and position calculation are performed.

Preferably, the arrival of portions of the signal is detected at least at two known positions. This allows the direction of propagation of the waves to be estimated, using a linear model (although there may be a remaining ambiguity about which of two directions has been observed). More preferably, the arrival of portions of the signal at least at three locations is detected. This can allow (1) the ambiguity mentioned above to be resolved; (2) the parameters of a curved model of wave-propagation to be estimated; or (3) direction of propagation and timing drift of the transmitter to be estimated, using the linear model of propagation. Still more preferably, the measurements are made at least at four locations. This allows the parameters of a curved wave-propagation model to be estimated, together with timing drift of the transmitter.

According to an aspect of the invention there is also provided a computer program comprising computer program code means adapted to perform all the steps of any preceding claim when said program is run on a computer. The computer program may be adapted to control one or more receiver devices to perform the steps of the method, when run. Also provided is such a computer program embodied on a computer readable medium.

According to another aspect of the invention, there is provided a portable electronic device operable to deduce information about its position by observing a transmitted signal having a known structure, the device comprising:
  a receiver, operable to
    receive, at a reference position, a first portion of the signal and
    receive, at an unknown position, a second portion of the signal; and
  a processor, adapted to:
    compare the timing of the two reception events;
    obtain a local wave propagation model of the signal, the model comprising an estimate of the direction of propagation of the signal in the neighbourhood of the reference position and unknown position; and
    use the direction of propagation and the result of the comparison to assist in the calculation of the unknown position relative to the reference position.

The portable electronic device preferably further comprises a satellite positioning receiver, wherein the satellite positioning receiver is adapted to determine the reference position when satellite reception is strong, and the processor is adapted to use the direction of propagation and result of the comparison to assist in the calculation of the unknown position when satellite reception is weak.

The invention will now be described by way of example with reference to the accompanying drawings, in which.

Figure 1:
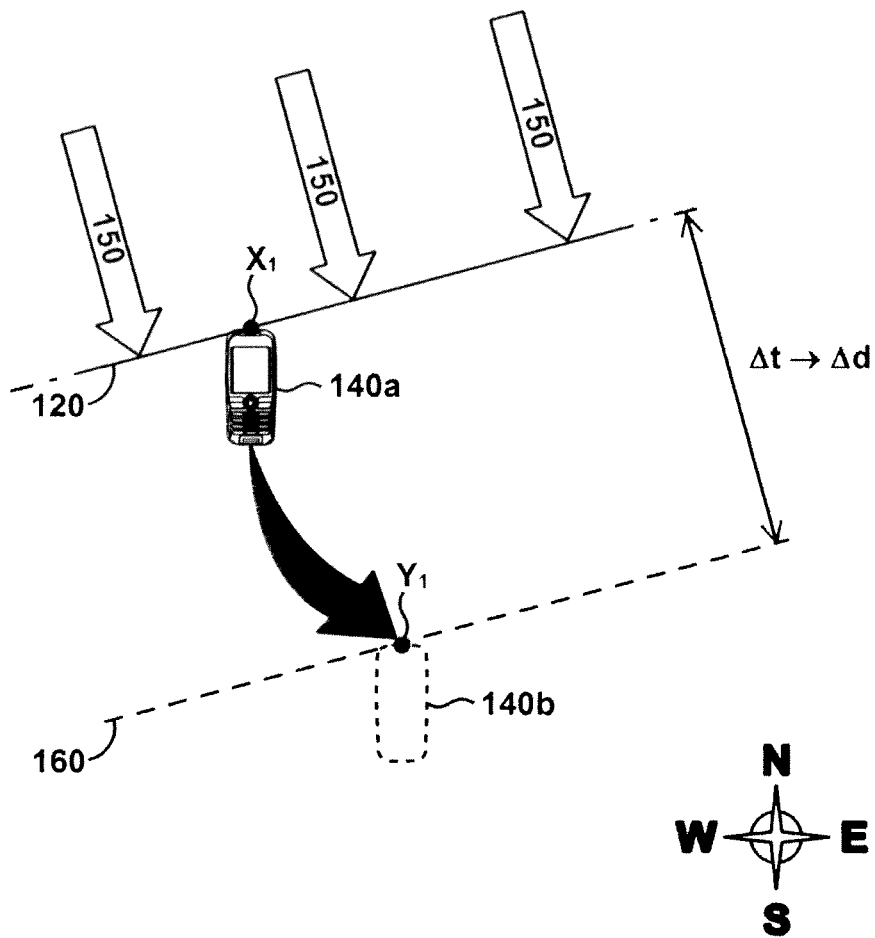
FIG. 1 illustrates a method of augmenting position estimation using a linear model of wave propagation, according to a first embodiment of the invention.
Figure 2:
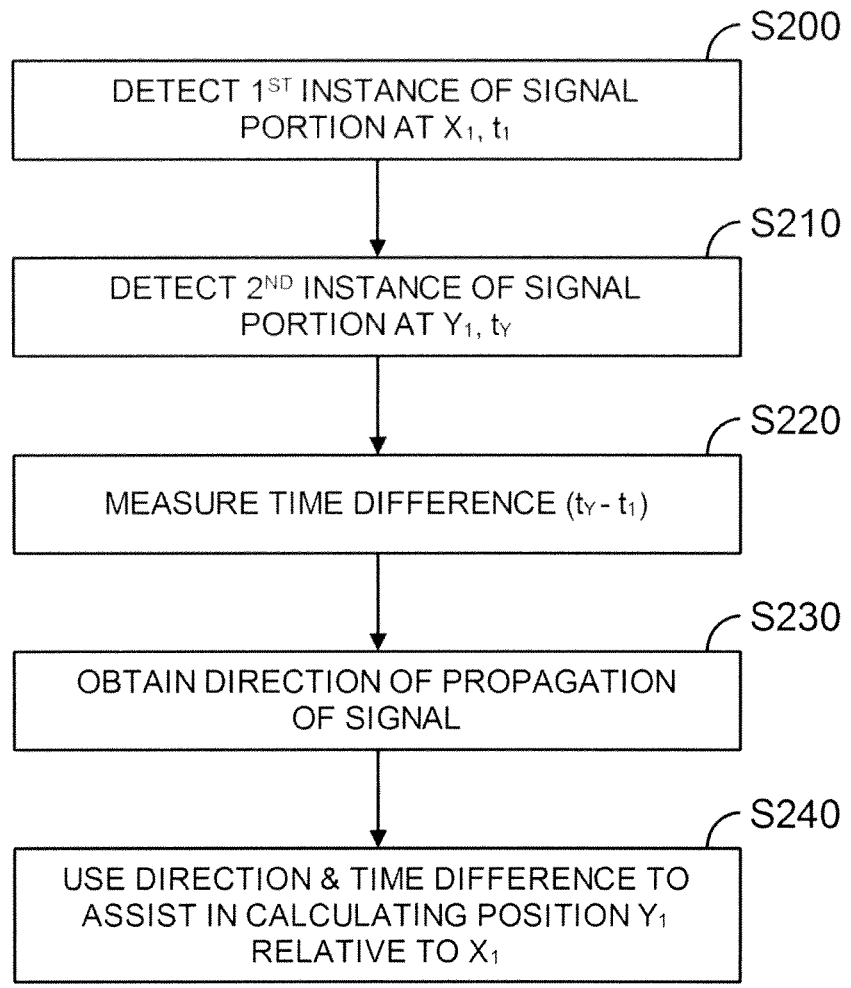
FIG. 2 is a flowchart of the method of the first embodiment.

A method according to a first exemplary embodiment of the invention will now be described, with reference to the FIG. 1 and FIG. 2. FIG. 1 is sketch of the geometry of the positioning method. The drawing is a plan view of a geographical area. It is assumed that the area is flat, so that all valid locations are co-planar, in a horizontal plane. That is, altitude will not be taken into account, in this simple example. FIG. 2 is a flowchart of the method It is desired to calculate an unknown position $Y_1$ with respect to a reference position $X_1$. The sketch of FIG. 1 shows the wavefront 120 of a signal of opportunity that is transmitted by a distant transmitter (not shown). The wavefront 120 is modelled as a straight line (in 2D) because of the large distance from the transmitter. The wavefront indicates a locus of positions at which the signal arrives simultaneously. The direction of propagation is indicated by arrows 150. Under the linear model, the wave propagates in a direction normal to the wavefront. The signal has a regular repeating structure, wherein an identifiable portion of the signal (such as a synchronisation symbol or codeword) is transmitted with a fixed period. Observations of this repetitive synchronisation portion of the signal can be used to infer information about the position of a receiver device. In this example, the receiver device 140 is a navigation device comprising a GPS receiver and a separate receiver for terrestrial signals of opportunity. The receiver device 140$a$ is shown at $X_1$ and its dashed outline 140$b$ is shown at $Y_1$.

In step S200, the receiver detects the arrival of a first instance of the synchronisation portion of the signal, when it is located at the reference position $X_1$. Here, the device is able to calculate its position and the current time using GPS, thus providing a known reference position $X_1$. The receiver records the time of arrival of the signal portion using a timestamp provided by GPS. The receiver also has an internal clock. This clock is assumed to be reasonably accurate. It is calibrated to GPS satellite time, when a GPS fix is available. When a GPS fix is unavailable, the clock may drift slowly with relative to GPS time. However, the magnitude of this drift can be assumed negligible over the interval of interest—for example, a few minutes. Preferably, the time, clock rate, and rate of drift (change in rate) of the internal clock are calibrated against GPS time, for example by conventional techniques. This may include, for example, compensation for temperature changes or other factors. Note that this calibration can be completely independent of any measurements of the signal of opportunity.

This recorded time of arrival at $X_1$ is denoted $t_1$. The device then moves to an unknown position $Y_1$, at which satellite positioning fails. $Y_1$ may be in a dense urban environment, under foliage or inside a building. Equally, satellite positioning may have failed due to accidental or malicious jamming of the GPS satellite signals. The receiver is still able to detect the terrestrial signal of opportunity. It makes a further measurement, in step S210, of the time of arrival of a second instance of the synchronisation portion of the signal at $Y_1$, recording this as $t_Y$. This time is only established using the internal clock, because a GPS fix is unavailable. However, it is assumed (as mentioned above) that the timing drift in the clock since the most recent calibration against GPS time is negligible (or is to some extent predictable and can therefore be compensated for). Relative to the measurement at the reference position. $X_1$, the distance travelled parallel to the signal propagation direction 150 is given by:

$$\Delta d = c \cdot [(t_Y - t_1) - (s_Y - s_1) - (z_Y - z_1)] \quad (1)$$

Here, c is the speed of light (the propagation speed of the radio waves making up the signal); and $s_Y$ is the time at which the transmitter transmitted the synchronisation portion of the signal detected by the receiver at $Y_1$. Likewise, $s_1$ is the time of transmission of the signal portion detected at $X_1$. The transmission times $s_1$ and $s_Y$ are those determined by the transmitter's clock. The timing offset of this clock relative to the receiver's clock is given by the values z.

If $f_1$ and $f_Y$ are the frame numbers of the synchronisation portions received at $X_1$ and $Y_1$ respectively and the frame period (the interval between successive synchronisation portions) is h, then the distance equation (1) can be rewritten:

$$\Delta d = c \cdot [(t_Y - t_1) - (1+u) \cdot h \cdot (f_Y - f_1)] \quad (2)$$

Here, u is the transmitter timing drift per unit time, relative to the clock in the receiver—a dimensionless quantity. This assumes linear drift: $Z_Y - Z_1 = u \cdot h \cdot (f_Y - f_1)$. The timing drift, u, is assumed known or zero. The signal structure parameters, h, $f_Y$, $f_1$, are also known and the frame interval, h, is assumed constant in this example. The frame numbers may be explicitly indicated in each synchronisation portion. Alternatively, the receiver may count the number of frames observed between the observations at the reference position $X_1$ and those at the unknown position $Y_1$. This allows the distance $\Delta d$ travelled parallel to the wave propagation direction 150 to be calculated, by calculating the time difference $t_Y - t_1$ between the times of arrival of the respective instances of the synchronisation portion of the signal (step S220); multiplying by the speed of light, c; and correcting for the difference in transmission times. The unknown location $Y_1$ must therefore lie somewhere along the dashed line 160 (which lies parallel to the wavefront and perpendicular to the propagation direction 150). The direction of propagation is obtained in step S230. Suitable exemplary ways of obtaining this direction will be described in detail subsequently.

The knowledge that the unknown position $Y_1$ lies on this line can be used to assist in calculating the position (step S240). For example, if at least one GPS satellite signal can be received sufficiently strongly to allow a pseudorange to be measured, this information can be used to determine where on the line 160 $Y_1$ is located. Alternatively, the process described above could be performed for a further signal of opportunity. That is, corresponding measurements of the second signal of opportunity could be taken when the receiver is in position $X_1$ and in position $Y_1$. This will produce another linear locus, like line 160. The intersection of the two lines provides the position of $Y_1$. Note that the further signal of opportunity (or satellite signal) should be propagating in a direction different to 150, otherwise the position $Y_1$ will remain uncertain. It may be desirable to measure additional signals, if they are available. Although strictly not necessary to solve for a unique position, they may increase robustness and accuracy—for example, by allowing an average position to be determined. This approach may be viewed as similar to techniques known in satellite positioning, where more than the absolute minimum number of satellite signals are used.

In the simple example given above, the receiver was moved from known reference $X_1$ to unknown position $Y_1$. Several variations of this basic method are possible. It is not essential for reference position $X_1$ to be known in absolute geographic coordinates (for example, via a GPS position fix). If the position $X_1$ is unknown, the method can still be used to infer the position $Y_1$ relative to $X_1$. Relative positioning may be useful or sufficient in many applications—for example, in many surveying tasks.

It is also not essential that a single receiver performs the timing observations at $X_1$ and $Y_1$. These could alternatively be performed by different receivers sharing observations. For this to be effective, the different receivers should share a common timing reference. In the case of two navigation devices each comprising a GPS receiver, this will be possible as long as the two GPS receivers take measurements with respect to GPS satellite time. Note that if two different devices are used to make the observations, the synchronisation portions of the signal that are observed by the two devices may, in general, be the same instance or different instances of the synchronisation portion.

The linear model of wave propagation exemplified in FIG. 1 is appropriate when calculating positions at a large distance from the transmitter. Here, large can be interpreted by reference to the area over which it is desired to calculate the positions. Hence, the linear model is more accurate when the distance between $X_1$ and $Y_1$ is small, compared with the distance of $X_1$ and $Y_1$ from the transmitter. In particular, the error may depend upon the distance along (that is parallel to) the wavefront 120. In general, the linear model can be used at any distance from the transmitter; however, the errors introduced by the simplified assumptions of this model will be more pronounced when the displacement parallel to the wavefront is comparable to the radial distance from the transmitter.

Figure 3:
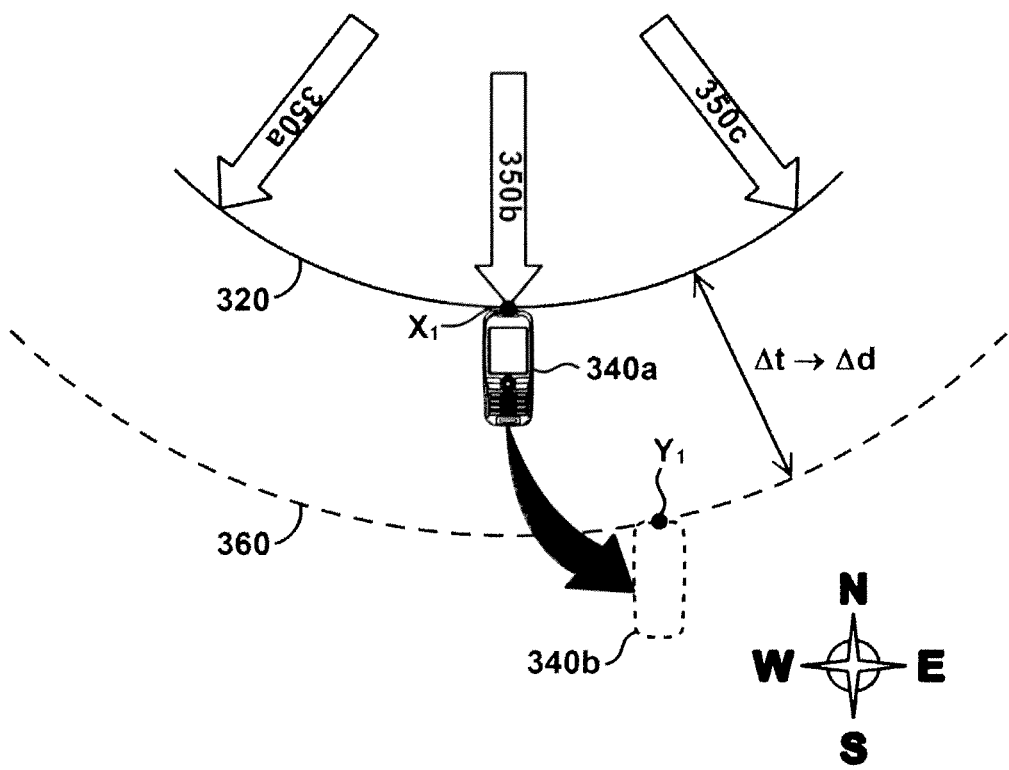
FIG. 3 illustrates a method of augmenting position estimation using a curved wavefront model, according to a second embodiment.

FIG. 3 is a sketch of the geometry of the position calculation when using a curved wavefront model, according to a second embodiment of the invention. Once again, the receiver device 340a is shown at $X_1$ and its dashed outline 340b is shown at $Y_1$. Here, the signals from the transmitter are modelled as propagating according to Huygens principle in the 2D plane. In the special case illustrated in FIG. 3, the signal propagates as an expanding circle. The curvature of the wavefront 320 is characterised by a radius of curvature. The direction of propagation 350a-c is different at different positions along the wavefront. Consequently, the wave propagation model in the vicinity of the reference position $X_1$ comprises the direction 350b of propagation at that position and the radius of curvature. A suitable method for estimating the radius of curvature will be described in greater detail subsequently.

The method steps and calculations for this model are similar to those described above for the first embodiment. However, unlike the first embodiment, the locus of positions along which the unknown position $Y_1$ is located is a curve 360, parallel to the wavefront 320. This curve has a radius of curvature that is larger than the radius of curvature of the wavefront 320 by a distance $\Delta d$. In general, the locus 360 is found by calculating, for each point along the wavefront, the normal vector to the wavefront 320, and propagating the wavefront by the same distance $\Delta d$, for all points, in the respective directions. For the special case in which the curved wavefront 320 is the arc of a circle, this method will produce a locus 360 that is the arc of a larger circle.

In a variation of the method, a curved wavefront can be propagated according to simplified assumptions. In particular, the propagation of the wavefront 320 may be modelled by a translation of the same shape by $\Delta d$ in the direction 350b. That is, the wavefront does not expand, but is assumed simply to shift (translate) in space. This simplified approach remains accurate to the extent that the position $Y_1$ happens to be located along the direction 350b, in line with $X_1$. However, the more $Y_1$ deviates from this central position the greater the error introduced. Nevertheless, this simplified assumption may produce acceptable results in many practical applications.

Figure 4:
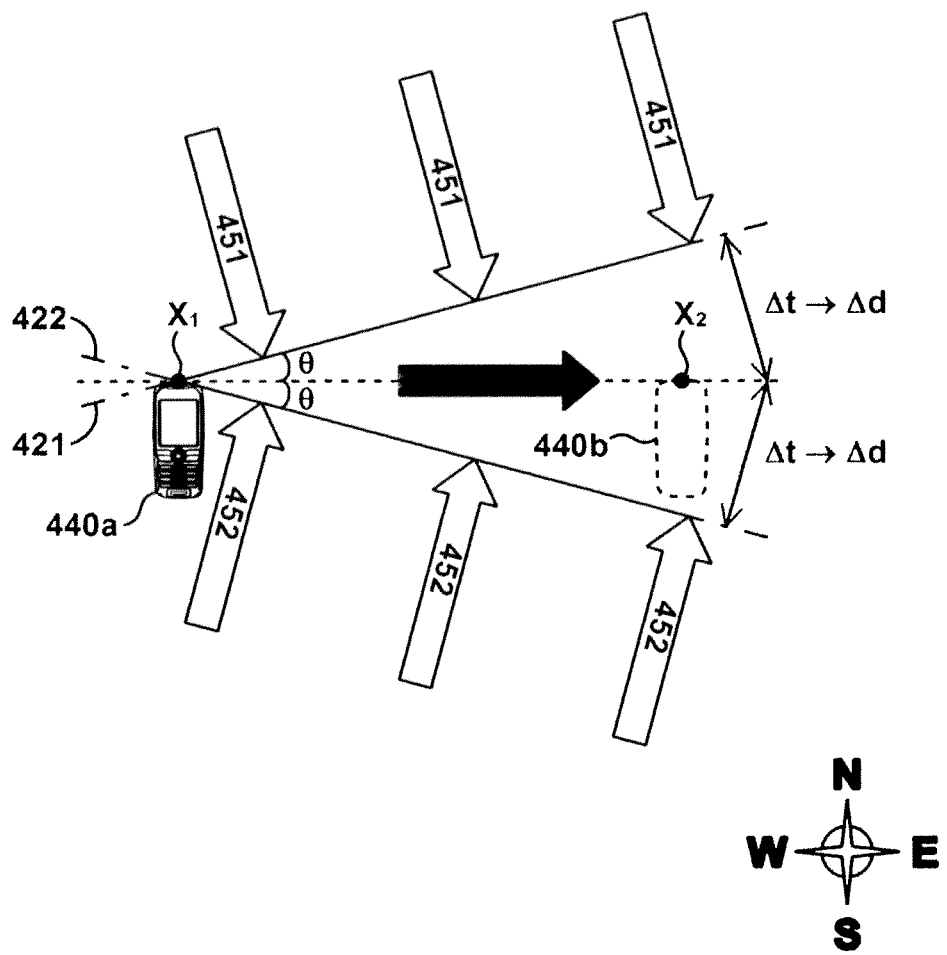
FIG. 4 illustrates a first method of obtaining a direction of propagation of a signal, according to embodiments of the invention, using timing measurements at diverse locations showing the ambiguity that arises using a linear model and only two measurement points.
Figure 5:
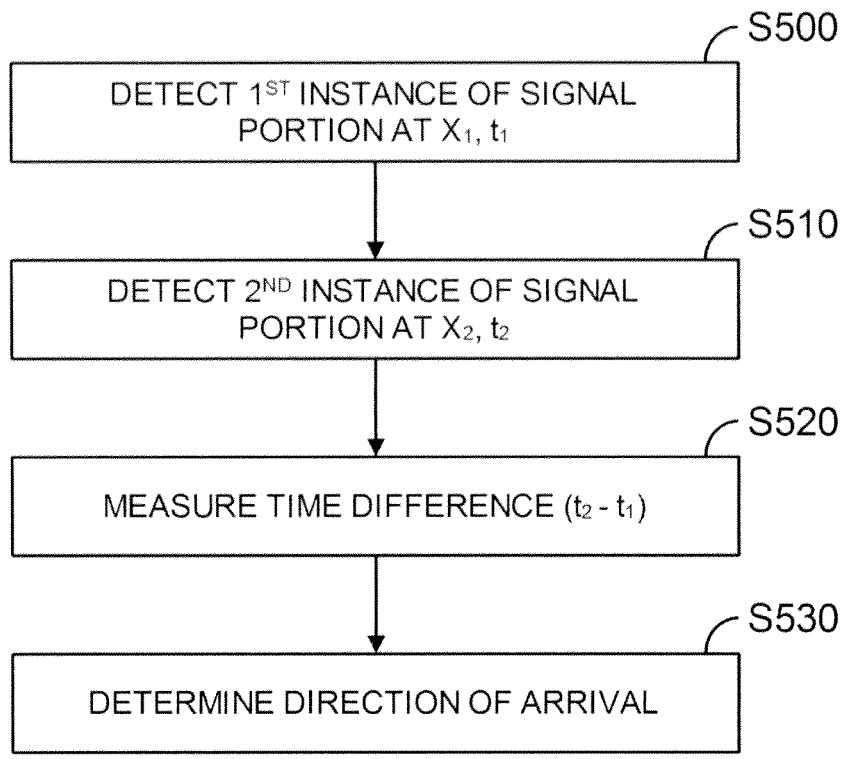
FIG. 5 is a flowchart of the method of FIG. 4.

FIG. 4 illustrates a first exemplary method of determining the direction of wave propagation for embodiments of the invention. FIG. 4 is a sketch showing the geometry of two sets of measurements made by the navigation device 440. Once more, the device 440a is shown at $X_1$ and its dashed outline 440b is shown at $Y_1$. FIG. 5 is a flowchart describing the method. In step S500, with the receiver at a known position $X_1$, the receiver measures the time of arrival $t_1$ of a first instance of a synchronisation portion of the SoOp. The receiver then moves to a second known position $X_2$ and, in step S510, measures the time of arrival $t_2$ of a second instance of the synchronisation portion of the signal. The positions $X_1$ and $X_2$ are determined using GPS. Likewise, the times $t_1$ and $t_2$ are measured according to GPS satellite time and are therefore an accurate reference. The difference between the two times of arrival is calculated in step S520. Equation (2) above can be used to determine the relative distance $\Delta d$ along the direction of propagation between $X_1$ and $X_2$, based on this time difference. The distance, D, between $X_1$ and $X_2$ is also known (because these two positions are known). Therefore, it is possible to calculate the angle $\theta$ between the displacement vector $X_1 X_2$ (the dashed line in FIG. 4) and the wavefront 421 or 422, in step S530, by the formula $\theta = \arcsin \Delta d / D$. This provides the orientation of the wavefront, and the direction of arrival of the wave 451 or 452 at $X_1$ and $X_2$ is perpendicular to this.

As illustrated in FIG. 4, this calculation does not provide a unique direction of propagation. It is assumed in FIG. 4 that the wave arrives relatively earlier at $X_1$ than $X_2$. That is, $X_1$ is closer to the transmitter. However, knowing the angle $\theta$, the direction of propagation could be either 451 or 452 depending on whether the transmitter is located to the south or north of the reference positions $X_1$ and $X_2$—that is, which side of the dashed line the transmitter is located. This ambiguity can be resolved by a third measurement of the time of arrival of a third instance of the synchronisation portion, at a known location provided it is not collinear with $X_1 X_2$. Alternatively, the transmitter location may be known approximately, such that it is clear to which side of the dashed line the transmitter is located.

In the foregoing description, it was assumed that the positions $X_1$ and $X_2$ were known (in absolute terms). This will allow the direction of arrival of the wavefront (that is, the direction of propagation in the neighbourhood of $X_1$ and $X_2$) to be determined absolutely. In other words, the result will be an absolute azimuthal angle of propagation, such as a compass bearing. However, if only relative positioning is required, the absolute positions of $X_1$ and $X_2$ need not be known. Instead, it will be sufficient to know the relative displacement vector between $X_1$ and $X_2$. This will allow the angle of propagation to be calculated relative to the displacement vector.

FIG. 4 illustrates how the direction of propagation of the signal can be established. This direction of propagation can then be used in a method such as that described above with reference to FIGS. 1 and 2, to calculate an unknown position $Y_1$. Either of the first or second positions. $X_1$ or $X_2$, in FIG. 4 may conveniently be used as a reference position for calculating $Y_1$.

Figure 6:
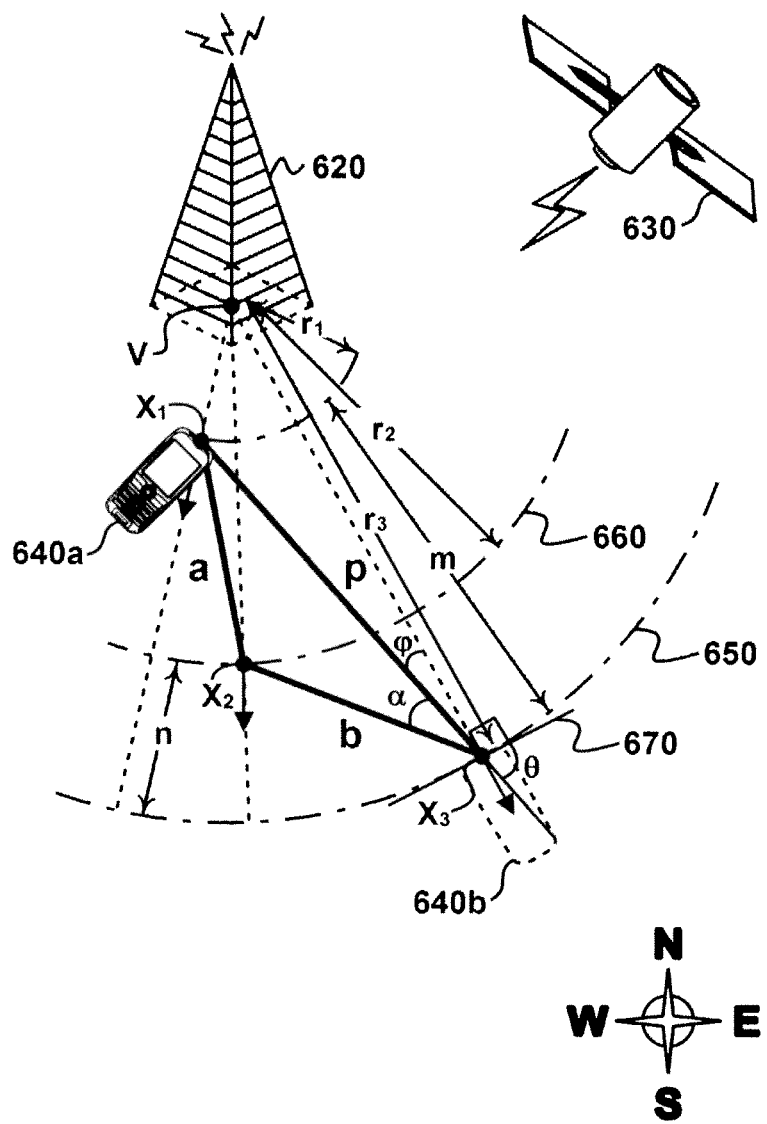
FIG. 6 illustrates a second method of obtaining the local wave propagation model, using a curved model of the wavefront.

FIG. 6 illustrates a second method of obtaining the local wave propagation model, using a curved model of the wavefront. The position $X_3$ lies on a wavefront 650. Also shown is the tangent 670 to the wavefront 650 at $X_3$. It is desired to determine the angle $\theta$ between this tangent 670 and the line $X_1 X_3$. This will be done using observations taken by the SoOp receiver of a navigation device 640. The receiver device 640a is shown at $X_1$ and its dashed outline 640b is shown at $Y_1$. The receiver measures times of arrival $t_1$, $t_2$, and $t_3$ of the synchronisation portion of three frames $f_1$, $f_2$, $f_3$ at three locations $X_1$, $X_2$ and $X_3$. The receiver is assumed to have an accurate clock, with the locations and times established by GPS.

The base station transmits frames $f_1$, $f_2$, and $f_3$ at times $s_1$, $s_2$, and $s_3$, respectively, as measured by the transmitter clock. The transmitter clock has a small drift u, giving rise to respective offsets in the time measurements by the transmitter clock relative to the clock measurements in the navigation device. These offsets are denoted $z_1$, $z_2$, and $z_3$. The transmitted signal (SoOp) has a frame time interval of h. The location of the transmitter 620 is V, and is not known.

Having measured the times of arrival of the different instances of the synchronisation portion of the signal, the next step is to calculate the time differences between them. This step is analogous to step S520 of FIG. 5.

For the measurements of frame $f_i$, the radius $r_i$ (that is, the radial distance from the transmitter) is given by:

$$r_i = c \cdot (t_i - (s_i + z_i))$$

Therefore, relative to the measurements at the last point, $X_3$, $$m = r_3 - r_1 = c \cdot ((t_3 - t_1) - (s_3 - s_1) - (z_3 - z_1))$$

and $$n = r_3 - r_2 = c \cdot ((t_3 - t_2) - (s_3 - s_2) - (z_3 - z_1))$$

The time interval between the transmission of frames i and j is $$s_j - s_i = h \cdot (f_j - f_i)$$

(assuming equal frame-duration, as before) and the transmitter drift between the transmission of frames i and j is $$z_j - z_i = u \cdot (s_j - s_i) = u \cdot h \cdot (f_j - f_i)$$

This gives $$m = c \cdot [(t_3 - t_1) - (1+u) \cdot h \cdot (f_3 - f_1)] \quad (3)$$

$$n = c \cdot [(t_3 - t_2) - (1+u) \cdot h \cdot (f_3 - f_2)] \quad (4)$$

The geometry of the three reference positions $X_1$, $X_2$ and $X_3$ is as follows. The distance from $X_1$ to $X_3$ is denoted p; the distance from $X_1$ to $X_2$ is denoted a; and the distance from $X_2$ to $X_3$ is denoted b. Next, the angle φ will be established. This is the angle formed between the line $X_1X_3$ and the radial line $VX_3$. It is related to θ by the relation $$\theta = 90° - \phi \quad (5)$$

Hence, calculating φ will enable θ to be calculated. To solve for φ, the unknowns are the angle α, between the lines $X_1X_3$ and $X_2X_3$ and the radial distance from the transmitter to $X_3$, $r_3$.

From triangle $X_1X_2X_3$, triangle $VX_2X_3$ and triangle $VX_2X_3$, respectively, it can be seen that $$a^2 = b^2 + p^2 - 2 \cdot bp \cdot \cos(\alpha)$$

$$(r_3 - m)^2 = r_3^2 + p^2 - 2 \cdot r_3 p \cdot \cos(\phi)$$

$$(r_3 - n)^2 = r_3^2 + b^2 - 2 \cdot r_3 p \cdot \cos(\phi) \quad (6)$$

The first equation enables a to be calculated without difficulty. Multiplying out and manipulating the second and third equations give, for the general case:

$$2 \cdot r_3 = (p^2 - m)/(p \cdot \cos(\phi) - m)$$

$$2 \cdot r_3 = (b^2 - m)/(b \cdot \cos(\phi + \alpha) - n)$$

Therefore, $$(p^2 - m) \cdot (b \cdot \cos(\phi + \alpha) - n) = (b^2 - n^2) \cdot (p \cdot \cos(\phi) - m)$$

This gives the equation with just φ unknown:

$$[b/(b^2 - n^2)] \cdot \cos(\phi + \alpha) - [p/(p^2 - m^2)] \cdot \cos(\phi) = n/(b^2 - n^2) - m/(p^2 - m^2) \quad (7)$$

There are some conditions, for example that b>n, and p>m. The observation positions $X_1$, $X_2$ and $X_3$ should preferably be well distributed—in particular, they should not lie on a common radius line from the transmitter. If they lie on a common radius line, the above equations are ill-determined; however, it will still be possible to solve the problem by a simplified set of equations. Nevertheless, in general it will usually be desirable to ensure that the three points are not collinear, because collinear points can lead to an ambiguity in the direction of arrival (see FIG. 4 above)—except in the special case in which they happen to be collinear on a radius line emanating from the transmitter.

Assuming, for simplicity, a stable transmitter oscillator, there is negligible oscillator drift, u=0, and the equivalent distances n and m are found from the timing-measurement equations (3) and (4). The distances a, b and p are known directly, based on the known positions $X_1$, $X_2$ and $X_3$, and the angle α is known from equation (6), which characterises the shape of the triangle formed by the observation. Equation (7) will then give φ. This calculation will now be described in greater detail.

Equation (7) gives $$[b/(b^2 - n^2)] \cdot \{\cos(\phi) \cdot \cos(\alpha) - \sin(\phi) \cdot \sin(\alpha)\} - [p/(p^2 - m^2)] \cdot \cos(\phi) = n/(b^2 - n^2) - m/(p^2 - m^2)$$

$$\{[b/(b^2 - n^2)] \cdot \cos(\alpha) - [p/(p^2 - m^2)]\} \cdot \cos(\phi) - \{[b/(b^2 - n^2)] \sin(\alpha)\} \cdot \sin(\phi) = n/(b^2 - n^2) - m/(p^2 - m^2)$$

Define $$A \cdot \cos(\gamma) = [b/(b^2 - n^2)] \cdot \cos(\alpha) - [p/(p^2 - m^2)]$$

$$A \cdot \sin(\gamma) = [b/(b^2 - n^2)] \cdot (8)$$

Then $$A^2 = \{[b/(b^2 - n^2)] \cdot \cos(\alpha) - [p/(p^2 - m^2)]\}^2 + \{[b/(b^2 - n^2)] \cdot \sin(\alpha)\}^2 \quad (9)$$

and $$A \cdot \cos(\gamma) \cdot \cos(\phi) - A \cdot \sin(\gamma) \cdot \sin(\phi) = n/(b^2 - n^2) - m/(p^2 - m^2)$$

$$A \cdot \cos(\gamma + \phi) = n/(b^2 - n^2) - m/(p^2 - m^2) \quad (10)$$

Therefore, with A found from equation (9), and γ found from equation (8), φ can be determined using equation (10). Note that A and γ are simply convenient intermediate variables to facilitate solving the equations.

Finally, equation (5) gives the angle θ of the wavefront at $X_3$. The angle θ expresses the direction of propagation at $X_3$, relative to the line $X_1X_3$. Since the positions $X_1$ and $X_3$ are known, in this example, it is trivial to convert θ into an absolute azimuthal angle (for example, a compass bearing).

Although it was assumed in the preceding calculations that $X_1$, $X_2$ and $X_3$ were known absolutely (that is, their absolute geographic coordinates are available), the same calculations can be performed even when these positions are only known relative to one another. This allows the angle θ describing the wave propagation direction at $X_3$ to be determined relative to the triangle $X_1X_2X_3$. In turn, unknown positions can then be calculated relative to this local frame of reference.

FIG. 6 has illustrated how parameters can be estimated for a curved model of signal-propagation. This model can then be used to estimate unknown positions in the neighbourhood of $X_1$, $X_2$, and $X_3$. This estimation can be performed using the methods illustrated in FIG. 1 or FIG. 3. In particular, even though the wave propagation has been characterised using a curved model, in FIG. 6, the linear model of FIG. 1 can still be used to calculate the unknown position Y1. To do this, the tangent 670 to the wavefront 650 of FIG. 6 is treated as the wavefront 150 for the linear model of FIG. 1. The position $X_3$ for which the angle θ of the wavefront was estimated, in FIG. 6, is used as the reference position $X_1$ in FIG. 1. Likewise, for the more complex model of FIG. 3, the position $X_3$ and angle θ from FIG. 6 are used to provide the reference position $X_1$ and direction 350b in FIG. 3. The radius of curvature at this reference position is $r_3$.

Figure 7:
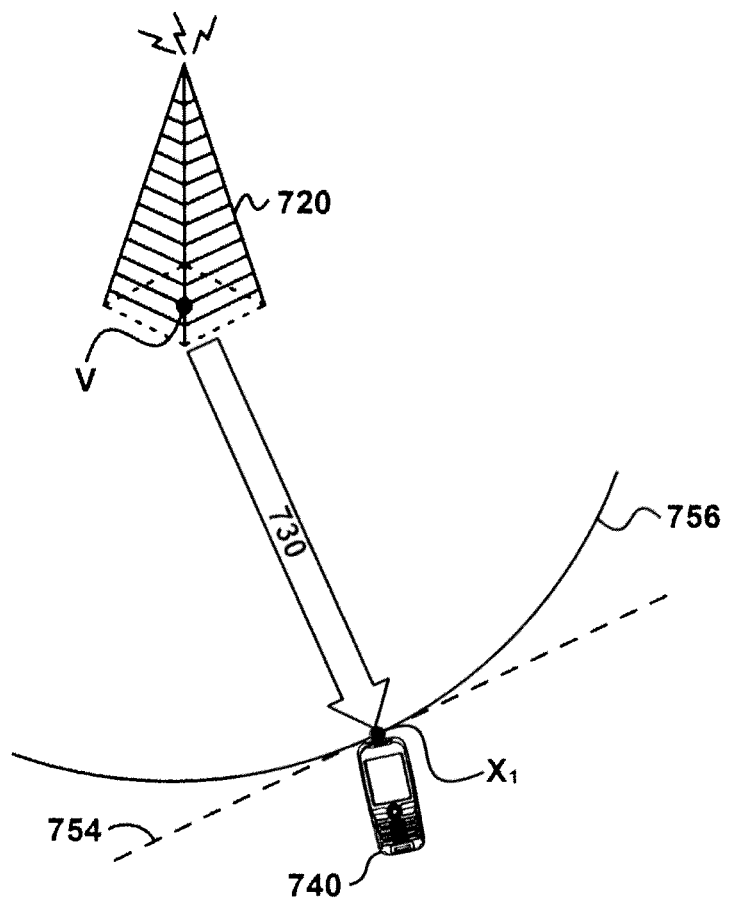
FIG. 7 illustrates a third method of obtaining the direction of propagation, using an estimate of the transmitter location.
Figure 7:
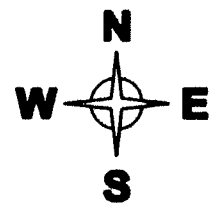

FIG. 7 illustrates a third method of obtaining a direction of propagation, using an estimate of the transmitter location. It is assumed that an approximate position is known for a transmitter 720 at location V. A reference position $X_1$ of a portable device 740 is also known (for example, from GPS). It is intended to use $X_1$ as a reference position for a method as illustrated in FIG. 1 or FIG. 3. It is therefore desired to know the direction of propagation of the signal at $X_1$. This can be determined easily by comparing the known positions V and $X_1$ and calculating the bearing from V to $X_1$. This is treated as the wave propagation direction (assuming there are no reflections). This direction is sufficient to characterise a linear model of a wavefront 754. If a curved wavefront 756 is required (for example, for the method illustrated in FIG. 3), then the radius of curvature can be estimated by using the distance between the known positions V and X1.

Figure 8:
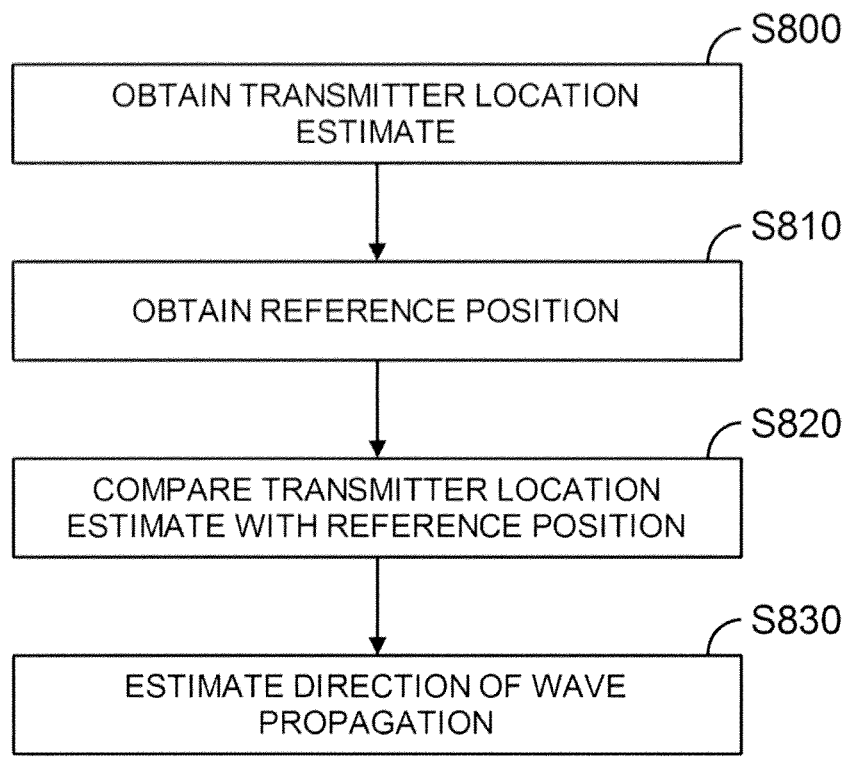
FIG. 8 is a flowchart of the third method.

FIG. 8 is a flowchart of the method used in connection with FIG. 7. In step S800, the transmitter location estimate V is obtained. In this example, the transmitter is identified based on the contents of the received signal. Many types of transmitter transmit identification codes suitable for this. Using the determined identity, the location of the transmitter is found from a database of transmitter locations. In step S810, a reference position is obtained. In this preferred example, the reference position is the same as the position $X_1$ used as the reference for positioning calculations using the local wave propagation model (FIG. 1 and FIG. 3). However, this is not essential. Another position in the same neighbourhood could also be used, with minimal detrimental effect on the accuracy of the model. The two positions are compared, in step S820, and, based on the result of the comparison, the direction of propagation is determined as the bearing from V to $X_1$ (step S830).

Note that although the transmitter location is used to derive the wave propagation parameters, it will not be used further in the position calculations. As explained previously above, the unknown position $Y_1$ will be calculated only with respect to the known reference position $X_1$. A resulting advantage is that the position calculation is less sensitive to errors in the estimated transmitter location. In contrast, if the unknown position $Y_1$ were to be calculated relative to the transmitter location V, then any error in the transmitter location estimate would be reproduced fully in the position calculations for $Y_1$. When the wave propagation model is used in the methods illustrated in FIGS. 1 and 3, errors in the position V have a very small effect on the estimation of the direction of propagation (and optionally the radius of curvature) of the wave. In particular, the direction of propagation will only be influenced by errors in the position V which lie perpendicular to the ray $VX_1$. The influence of such errors on the estimated angle will be small, provided that $X_1$ and V are far apart (as will usually be the case, in practice). Furthermore, a small error in the angle will have an even smaller influence on the calculation of positions that lie in the neighbourhood of $X_1$. The closer the unknown position $Y_1$ lies to $X_1$, the smaller the error will be. Consequently, compared to prior art positioning methods which determine position relative to the known transmitter location, the approach of the present invention attenuates the effect of errors in that location.

Figure 9:
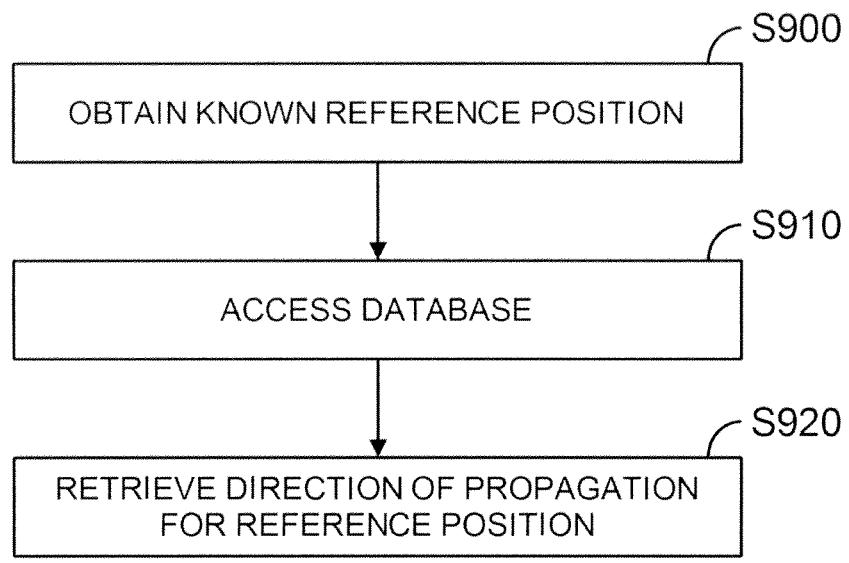
FIG. 9 is a flowchart illustrating a fourth method of obtaining the direction of propagation, using a database of directions.

A fourth method of obtaining a direction of propagation will now be described, with reference to the flowchart of FIG. 9. It is assumed that the identity of the transmitter of the SoOp has been established. As mentioned above, this can be done by studying the contents of the transmission.

In step S900 a known reference position in the neighbourhood of interest is obtained. This is preferably the same as the reference position $X_1$ that will be used for positioning calculations (see FIGS. 1 and 3), but another nearby position could equally be used, with little detrimental effect. Next, in step S910, a database is accessed, using the transmitter identity and reference position as keys. The database stores the direction of arrival of signals from the transmitter at each of a plurality of locations. For example, for a transmitter located at Cartesian coordinates (0, 0), the direction of arrival of its signal at various positions in a 2D grid may be represented as shown in Table 1. The angles are given as compass bearings, clockwise from North at 0°.

TABLE 1

Exemplary directions-of-arrival database

| (0, 0) | X = 1 | X = 2 | X = 3 |
|---|---|---|---|
| Y = 1 | 135° | 117° | 108° |
| Y = 2 | 153° | 135° | 124° |
| Y = 3 | 161° | 146° | 135° |

The bearings in this table are calculated based on direct line of sight to the transmitter. Consequently, the data in Table 1 give exactly the same results as the third method above, in which the transmitter location and reference location are compared and a bearing calculated. However, the use of a database is more versatile, in general. In particular, the environment may be more complex and the signals may not propagate in straight rays from the transmitter to the receiver. The database can incorporate predicted or measured deviations in the angle of arrival at each location. For example, in areas where a reflected version of the signal is received, the angle with which the reflection arrives can be described in the database.

In step S920, the appropriate direction of propagation associated with the particular transmitter and particular reference position is retrieved from the database. This direction of propagation can be used in the method illustrated in FIG. 1. In some other embodiments, the database may also store a curvature parameter for the wave propagation model at each position. This may include a radius of curvature, for example. This can be used for is positioning with a curved model of wave propagation, as explained previously above, with reference to FIG. 3.

Figure 10:
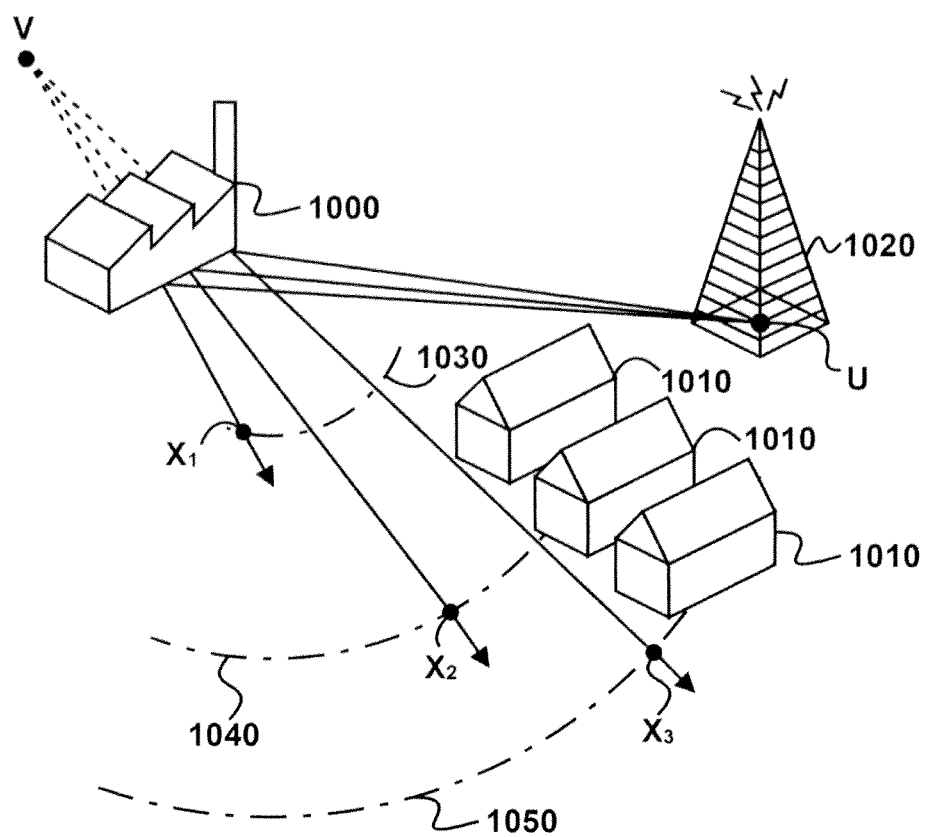
FIG. 10 shows a signal being reflected by an obstacle.
Figure 10:
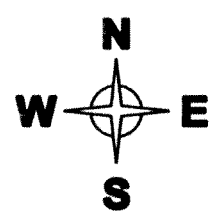

FIG. 10 illustrates the changes in direction caused by reflection of a signal from an obstacle. A signal from a transmitter 1020 at position U is reflected by building 1000. Meanwhile, the direct reception of the signal at positions $X_1$, $X_2$, and $X_3$ is blocked by other buildings 1010. The effect of the reflection is the same as if a "virtual" transmitter were positioned at image position V. Positioning methods according to aspects of the present invention are immune to such reflections, because they do not rely on knowledge of the transmitter location in order to determine an unknown position. Instead, they rely only on knowledge of the local propagation of signals from the transmitter (and at least one local reference position).

Furthermore, the first, second, and fourth methods of obtaining the direction of propagation (described above) can be robust to such reflections. Only the third method of determining the direction is inherently sensitive to reflections, because it relies on an estimate of the transmitter location and assumes direct line-of-sight propagation of the signal.

Figure 11:
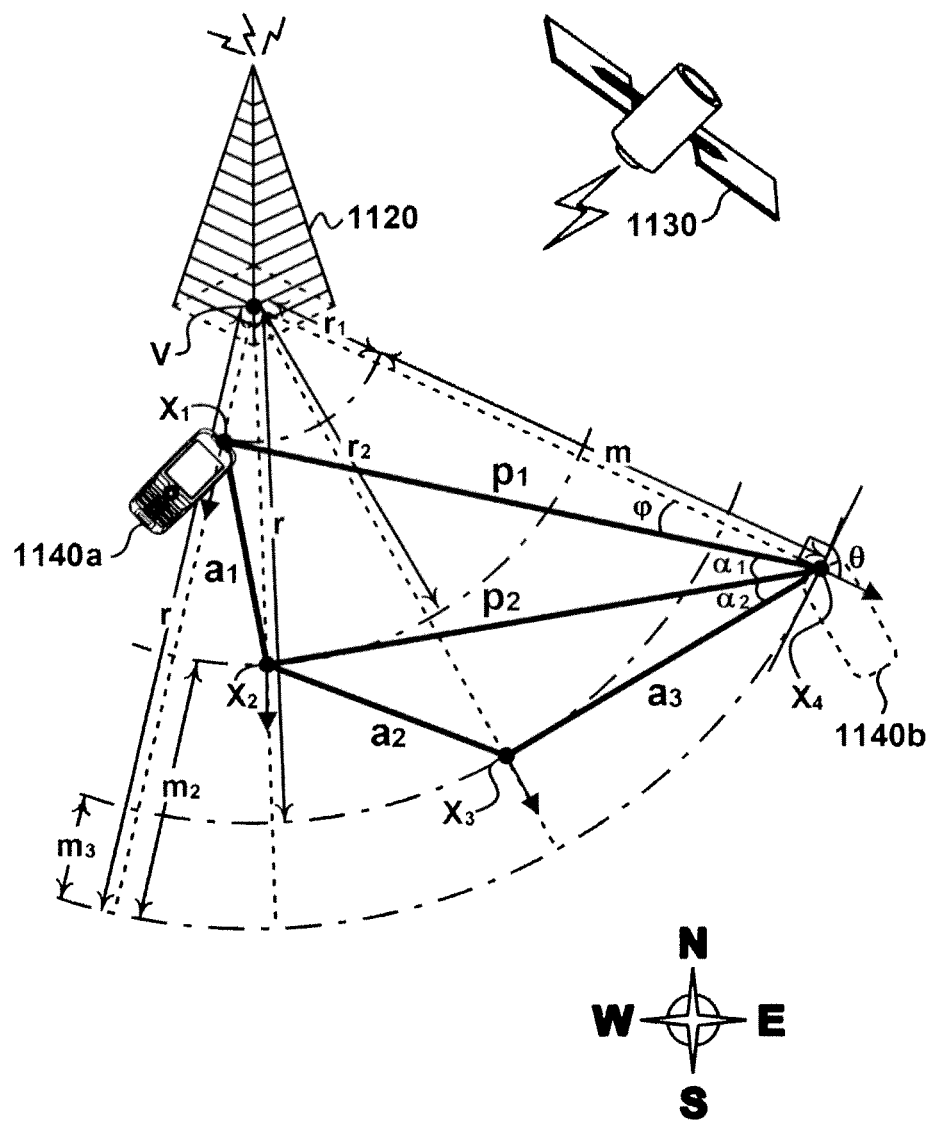
FIG. 11 illustrates a method of estimating a timing drift of the transmitter of the signal, according to an embodiment.

FIG. 11 illustrates a method of estimating a timing drift of the transmitter 1120 of a signal of opportunity, according to an embodiment of the invention. The geometry is similar to that of FIG. 6. The receiver device 1140a is shown at $X_1$ and its dashed outline 1140b is shown at $Y_1$. If the drift, u, of the transmitter timing is unknown, then a further observation measurement is required in order to estimate this as well. With four observations by the receiver at $t_1$, $t_2$, $t_3$ and $t_4$ of the frames $f_1$, $f_2$, $f_3$, $f_4$ at positions $X_1$, $X_2$, $X_3$ and $X_4$ the geometry can be described as illustrated in FIG. 11.

Similarly to FIG. 6, from the geometry of the known observation positions $X_i$, the variables $a_i$, $p_i$ and $\alpha_i$ can be calculated:

$$a_1^2 = p_1^2 + p_2^2 - 2 \cdot p_1 p_2 \cdot \cos(\alpha_1)$$

$$a_2^2 = p_2^2 + a_3^2 - 2 \cdot p_2 a_3 \cdot \cos(\alpha_2)$$

Likewise, there are three equations for the timing measurements:

$$m_i = c \cdot [(t_4 - t_i) - (1+u) \cdot h \cdot (f_4 - f_i)] \text{ for } i=1,2,3 \quad (11)$$

There are also the following equations from the wavefront geometry:

$$(r_4 - m_1)^2 = r_4^2 + p_1^2 - 2 \cdot r_4 p_1 \cdot \cos(\phi)$$

$$(r_4-m_2)^2 = r_4^2 + p_2^2 - 2 \cdot r_4 p_2 \cdot \cos(\phi + \alpha_1)$$

$$(r_4-m_3)^2 = r_4^2 + a_3^2 - 2 \cdot r_4 a_3 \cdot \cos(\phi + \alpha_1 + \alpha_2)$$

These can be rearranged to give:

$$2 \cdot r_4 = (p_1^2 - m_1^2)/(p_1 \cdot \cos(\phi) - m_1)$$

$$2 \cdot r_4 = (p_2^2 - m_2^2)/(p_2 \cdot \cos(\phi + \alpha_1) - m_1)$$

$$2 \cdot r_4 = (a_3^2 - m_3^2)/(a_3 \cdot \cos(\phi + \alpha_1 + \alpha_2) - m_3)$$

and $r_4$ can be eliminated to give $$(p_1^2 - m_1^2) \cdot (p_2 \cdot \cos(\phi + \alpha_1) - m_2) = (p_2^2 - m_2^2) \cdot (p_1 \cdot \cos(\phi) - m_1)$$

$$(p_1^2 - m_1^2) \cdot (a_3 \cdot \cos(\phi + \alpha_1 + \alpha_2) - m_3) = (a_3^2 - m_3^2) \cdot (p_1 \cdot \cos(\phi) - m_1) \quad (12)$$

These two equations (12), together with timing measurements (11), are then sufficient to solve for the two unknowns: $\phi$, and u, the transmitter drift. As noted previously above, $\phi$ is related to $\theta$ by equation (5): $\theta = 90° - \phi$. Here, $\theta$ is the angle between the direction of propagation and the baseline $X_1 X_3$. This is a convenient way to characterise the direction of propagation—especially if the positions $X_i$ are only known relative to one another. If the positions $X_i$ are known in absolute geographic coordinates, the angle $\theta$ can be readily converted into a compass bearing.

The examples described above have assumed that the coordinates of the positions $X_i$ are known (at least relative to one another). This assumption corresponds, for example, to a scenario in which the $X_i$ are established by means of GNSS. In other embodiments, the $X_i$ might be established by means of an inertial positioning system and compass. In this case, the relative positions are likely to be obtained in the form of displacements and angles. However, those skilled in the art will appreciate that it is possible to solve an equivalent, but differently expressed, set of equations for that scenario.

Figure 12:
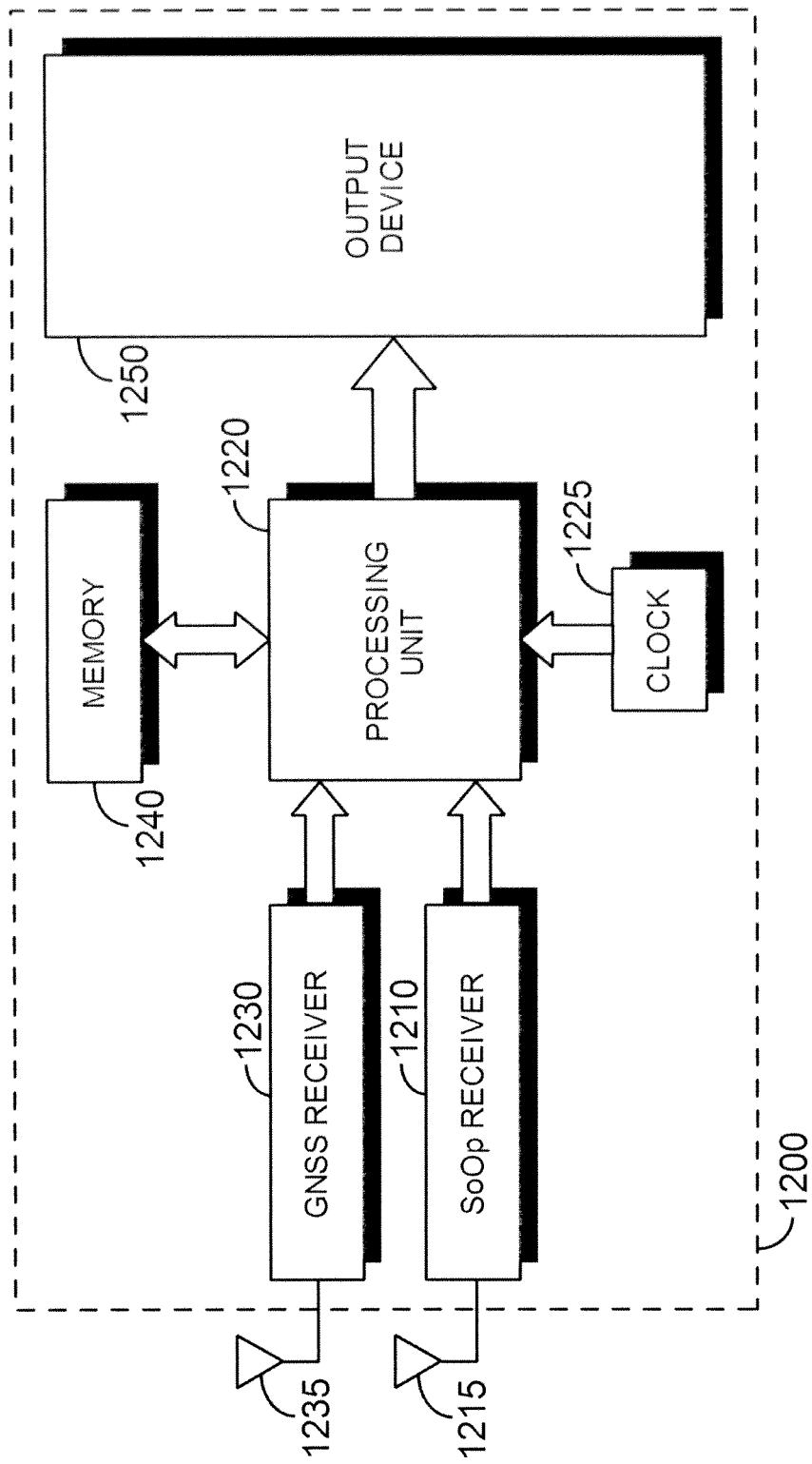
FIG. 12 is a block diagram of a navigation device according to an embodiment of the invention.

FIG. 12 is a block diagram of a portable electronic device according to an embodiment of the invention. In this example, the portable electronic device is a navigation device 1200. The device comprises a receiver 1210 adapted to receive signals of opportunity, which is coupled to an associated antenna 1215. It also comprises a processing unit 1220 for performing positioning calculations. A clock 1225 is provided, for measuring the times of arrival of different portions of the signal of opportunity. The processing unit is coupled to and receives data from the SoOp receiver 1210. The processing unit 1220 is also coupled to and receives data from a GNSS receiver 1230. The GNSS receiver 1230 is adapted to receive satellite positioning signals via an antenna 1235 and to process them to calculate a position fix.

More particularly, the SoOp receiver 1210 is adapted to receive S200, at a reference position $X_1$, a first instance of a synchronisation portion of the signal of opportunity and receive S210, at an unknown position $Y_1$, a second instance of the synchronisation portion. The local clock 1225 is operable to measure S220 a first time difference between these two reception events. The processing unit 1220 is adapted to: obtain S230 a local wave propagation model of the signal, the model comprising at least an estimate of the direction of propagation of the signal in the neighbourhood of the reference position $X_1$ and the unknown position $Y_1$. It is further adapted to use the direction of propagation and the first time difference to assist in the calculation of the unknown position relative to the reference position (step S240).

The navigation device also comprises a memory 1240 and an output device 1250. The memory can hold a database of transmitter identities and positions. These may be used in a method of estimating wave propagation parameters, as described above with reference to FIGS. 7 and 8. The memory may also hold a database of signal-arrival directions, similar to the example of Table 1 above. This information may be used by the navigation device in the fourth method of estimating local wave propagation parameters, described earlier above. The memory 1240 may also store local wave propagation models for one or more geographic areas. In general each local wave propagation model comprises a direction of propagation, and an indication of the position or area to which that direction pertains. The local model may be associated with a particular transmitter identity. If the local wave propagation model is curved, the memory 1240 may also store an associated curvature parameter. Furthermore, the model may also include a timing drift parameter, associated with the transmitter, which is also stored in the memory. The local wave propagation models can be obtained by any suitable method, including any one of the methods described above. Storing the models in the memory may allow them to be reused, such that the model does not need to be obtained or calculated each time a position fix is required, thus reducing computational burden and/or power consumption in the navigation device 1200.

The output device 1250 is used to report position information to a user or another electronic device which has requested this information from the navigation device 1200. The output device 1250 may comprise a human interface, such as a graphical display, or a machine interface, such as an electrical bus connection or a wireless communications link.

In the embodiments described above it is assumed that the transmitter is terrestrial and positioned in a fixed location. However, this is not essential. It is sufficient that the transmitter is stationary for the duration over which the signal measurements will be used. In general, it is not necessary to know the transmitter location or the transmitter timing.

The structure of the received signal should be known to some extent. In particular, if the portions of the signal are each different portions (as will usually be the case) then their relative timing should preferably be known and stable (or at least any variation systematically predictable). For example, the portions of the signal whose times of arrival are measured may be different iterations of a periodic synchronisation symbol of the signal. In this case, the period of the synchronisation signal should preferably be known.

The observed portion of the signal which is used for the timing may be, for example: the transmission of the signal (which may be pulses of signals, as in the Loran system); the frame structure of a continuous signal (for example synchronisation words in a cellular system); or modulation of a signal (for example time signal "beeps" sent over a broadcast channel). However, any other predictable and reliably detectable signal feature could be used, including but not limited to a signal leading edge; trailing edge; or zero-crossing.

Knowing the wavefront model of a single SoOp is not enough to uniquely determine position, by itself. In this case, the receiver cannot determine where along the wavefront it is positioned. Multiple signals originating from differently located transmitters can be measured in order to constrain the possibilities. The measurements for each signal will imply a particular set (or locus) of possible positions for the receiving device. The intersection of these sets determines the actual position.

If the system uses only terrestrial signals of opportunity, then it might only be possible to calculate a 2D position, because of the limited range of heights of the transmitters. In 2D, the direction of arrival of the signal is then an azimuthal (compass) direction. Each of the examples described in detail above have considered positioning in a 2D plane, for this reason. However, those skilled in the art will by now appreciate the techniques described herein are not limited to the 2D planar case. To the extent that signal sources (transmitters) are available which have varying heights out of the plane, it will in theory be possible to calculate position information (such as a locus of possible positions) in 3D. Additional measurements and a greater number of sources will generally be needed to achieve this, compared with the 2D examples above.

As mentioned previously above, the information from one or more SoOps can be combined with (partial) satellite positioning information, so that one augments the other. One suitable method of combining and maintaining a sequence of position fixes using different sources of information is a Kalman filter. Those skilled in the art will be familiar with such techniques for integrating disparate sources of positioning information. This can be very effective in maintaining tracking of the likely path of the user in areas experiencing incomplete GPS coverage—for example, where a GPS receiver is able to measure its range with respect to some satellites 630, 1130, but for a short period of time too few satellite signals are available to calculate a unique position fix.

For the present invention, the combination of the SoOp approach with GPS is seen as particularly advantageous, because of the synergy between the two systems. When GPS reception is good, the GPS receiver produces the known positions that are needed to estimate the local wavefront of the SoOp. When the GPS reception is incomplete, the device can use the derived SoOp wavefront model to augment the GPS. If GPS reception is lost completely, the device can rely solely on SoOps (provided enough transmitters have been observed and their wavefronts modelled).

Note that the combination with one or more GPS-satellite measurements can also allow the calculation of position in three dimensions (e.g. including altitude as well as latitude and longitude). In this case, the direction of arrival of a SoOp may be specified in terms of both azimuth and elevation (angle above or below the horizon). In 3D, with one SoOp, the locus of positions to which the unknown position can be constrained is a 2D shell (surface). This surface will be a plane, when using a linear model of the wavefront; or a spherical element, when modelling as a curved wavefront.

Note that methods according to embodiments of the invention can be implemented in a distributed fashion: the measurements at the various reference positions may be made by a different device (or devices) to the receiver device whose unknown position is to be determined. The devices should share a common timing reference (such as GPS), in order to make consistent comparisons among the times of arrival of different portions of the signal. Nevertheless, a single-device implementation may be preferred in some applications, since it avoids the need for communication and synchronisation among multiple devices.

Alternatively or in addition to distributed measurements, some of the computational activity may be shared between different devices. For example, a server computer may assist client devices to calculate their positions. Furthermore, where a database is used, it may be preferable for it to be stored and/or maintained centrally; shared between devices; or constructed in isolation, using the previous observations of a single receiver. The preferred implementation will depend upon the circumstances, as will be apparent to those skilled in the art.

Note that the ordering of operations in the methods described above is generally non-limiting. For example, a known reference position $X_1$ may be visited before or after an unknown position $Y_1$, whose position it is desired to determine. Likewise, a wave propagation model may be estimated or otherwise obtained before or after the reference position or unknown position have been visited. Once the necessary timing measurements have been made and the propagation model established (in whatever sequence), the information can be used to assist position-calculations at any subsequent time. Thus, for example, the position calculation need not be performed at the time and place of the unknown position $Y_1$. It could be performed at any time after the timing measurements have been made at $Y_1$, provided the necessary wave propagation model and timing measurements at a reference position $X_1$ are available.

Note also that the steps of the method may be distributed in time in a variety of different ways. In the embodiments described above, the implicit aim was to calculate the position of the device in real-time—that is, as soon as sufficient information and signal observations/measurements were available to deduce position information. However, in other embodiments the aim may be to retrospectively track the positions that were visited by the receiver device. In the field of satellite positioning, as well as real-time positioning, it is also known to provide a receiver which digitises received satellite signals and stores them for later processing to calculate a position fix. Such receivers are sometimes known as "store and process later" or "capture and process" receivers. In one example, satellite signals are received in an RF front-end, down-converted to an intermediate frequency (greater than or equal to zero) and digitised by an analogue to digital converter. The modulated signals from each of the visible satellites are preserved in the sequence of samples. The samples can be retrieved from memory and processed later, in the same way that they would have been in a real-time receiver.

A similar approach is also possible with the present invention. That is, satellite signals and/or signals of opportunity may be received, digitised and stored for later processing. The actual processing may be the same as in the examples described above; however, it is performed upon a sequence of samples in a memory, rather than upon the same sequence of samples immediately after they have been received and digitised. The advantages of such a system are similar to those of GNSS capture and process receivers: reduced device complexity; reduced cost; reduced power consumption, and/or increased battery life. Preferably, the samples are stored with a time-stamp generated by the local clock (which is calibrated to satellite time, when possible).

In this case, the step of obtaining the wave propagation model is not necessarily performed in real-time, but can be performed later, only if requested. For example, whenever it is desired to calculate an unknown position $Y_1$, previously stored signal samples recorded at positions $W_i$ may be retrieved from memory (along with their time stamps) to determine the parameters of the local wave propagation model. The reference positions $X_i$ for the method may be a subset of the positions $W_i$ for which signal samples were stored. In general, it might not be possible to calculate GPS position fixes for some of the $W_i$, in which case they might not be usable in the method.

While the invention has been illustrated and described in detail in the drawings and foregoing description, such illustration and description are to be considered illustrative or exemplary and not restrictive; the invention is not limited to the disclosed embodiments.

For example, although several exemplary methods were described above, for determining a direction of propagation (and other parameters of the local wave propagation model) it is possible to operate the invention in an embodiment in which the direction of propagation is estimated by other means. For example, it may be possible to obtain an estimate of the direction of arrival of the signal using an antenna-array and a compass. Those skilled in the art will be well aware of prior art algorithms for estimating the direction of arrival of a radio signal, such as "Multiple Signal Classification" (MUSIC). Once the direction of arrival has been determined relative to the antenna array, a compass can be used to relate this angle to a compass bearing.

Although GPS is used in the foregoing description as an example of a leading Global Navigation Satellite System, other satellite positioning systems can be used—including but not limited to GLONASS and Galileo.

In general, it is not necessary for the receiver to communicate any information to the transmitter of the SoOp. In this sense, the method is passive: it comprises observations of the signal, but not necessarily any interaction with the transmitter. Nevertheless, in some embodiments, the receiver and transmitter may communicate bi-directionally. For example, the receiver may be a mobile device and the transmitter may be a base-station in a network to which the mobile device is subscribed. Those skilled in the art will appreciate that this is not essential for the operation of the present methods in their most general form.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of assisting the calculation of the position of a receiver device (1200) including a receiver (1210), by observing a transmitted signal having a known structure, the method comprising:
    comparing (S220) the time of arrival, at the receiver, of a first portion of the signal, with the time of arrival, at the receiver, of a second portion of the signal, wherein the first portion of the signal is received by the receiver at a reference position ($X_1$), and the second portion of the signal is received by the receiver at an unknown position ($Y_1$);
    obtaining (S230) a local wave propagation model of the signal, the model comprising an estimate of the direction of propagation of the signal, said estimate describing how the signal propagates in the neighbourhood of the reference position and unknown position; and
    using (S240)
        the direction of propagation and
        the result of the comparison
    to assist in the calculation of the unknown position relative to the reference position.

2. The method of claim 1, wherein the step of obtaining the direction of propagation of the signal comprises:
    a second comparison (S520), between the time of arrival, at a first position ($X_1$), of a third portion of the signal and the time of arrival, at a second different position ($X_2$), of a fourth portion of the signal,
    wherein a displacement vector between these two positions is known; and
    estimating (S530) the direction of arrival of the signal based on the displacement vector and the result of the second comparison.

3. The method of claim 2, further comprising:
    a third comparison between the time of arrival, at a third position ($X_3$) of a fifth portion of the signal and the time of arrival, at the first or second position ($X_1$, $X_2$), of the third or fourth portion, respectively,
    wherein a displacement vector between the third position and the respective one of the first and second positions is known; and
    at least one of:
    (i) estimating a curvature parameter of the local wave propagation model;
    (ii) resolving which of a plurality of hypotheses about the direction of arrival is true; and
    (iii) refining a single hypothesis about the direction of arrival,
    based on the results of the second and third comparisons and the relative displacements among the first, second, and third positions.

4. The method of claim 1, wherein the step of obtaining the direction of propagation of the signal comprises:
    obtaining (S800) an estimate of the location (V) of the transmitter (720) of the signal;
    obtaining (S810) an estimate of a position ($X_1$) in the neighbourhood of the reference position and the unknown position;
    comparing (S820) the estimated transmitter location (V) with said position ($X_1$) in the neighbourhood; and
    estimating (S830) the direction of propagation of the signal based on the result of the comparison.

5. The method of claim 1, wherein the step of obtaining the direction of propagation of the signal comprises:
    obtaining (S900) an estimate of a position in the neighbourhood of the reference position and the unknown position;
    accessing (S910) a database describing a plurality of positions, wherein the database describes a direction of propagation of the signal for each of those positions; and
    retrieving (S920) from the database a direction of propagation of the signal for said position in the neighbourhood.

6. The method of claim 1, wherein the step of assisting in the calculation of the unknown position comprises:
    based on the result of the first comparison, determining a locus of positions, within which the unknown position ($Y_1$) lies relative to the reference position ($X_1$).

7. The method of claim 6, further comprising combining the determined locus of positions with additional data, comprising one or more of:
    position information derived from measurements of global navigation satellite signals;
    position information derived from measurements of a further transmitted signal having a known structure; and
    information from an inertial positioning system.

8. The method of claim 1, wherein the local wave propagation is modelled by a straight line (120).

9. The method of claim 1, wherein the local wave propagation is modelled by a curve (320),
    wherein the curvature is used in the step of assisting the calculation of the unknown position.

10. The method of claim 1, wherein the reference position ($X_1$) is known, preferably having been determined using a satellite positioning system.

11. The method of claim 1, further comprising:
measuring and/or comparing one or more times of arrival of additional portions of the signal at one or more additional positions, and
using the results of these measurements or comparisons for one or more of:
(i) increasing accuracy or robustness by averaging measurements;
(ii) resolving an ambiguity in the direction of propagation of the signal;
(iii) estimating a curvature parameter for the wave propagation model; and
(iv) estimating a drift in timing of the transmitter of the signal.

12. A non-transitory computer readable medium having embodied thereon a computer program comprising computer program code adapted to control a physical computing device to perform all the steps of claim 1 when said program code is executed by a computer.

13. The method of claim 1, wherein the unknown position is determined without reference to the position of the transmitter from which the signal originated.

14. The method of claim 1, wherein the signal is transmitted from a terrestrial transmitter.

15. A portable electronic device (1200) operable to deduce information about its position by observing a transmitted signal having a known structure, the device comprising:
a receiver (1210), configured to
receive (S200), at a reference position ($X_1$), a first portion of the signal and
receive (S210), at an unknown position ($Y_1$), a second portion of the signal; and
a processor (1220), adapted to:
compare (S220) the timing of the two reception events;
obtain (S230) a local wave propagation model of the signal, the model comprising an estimate of the direction of propagation of the signal, said estimate describing how the signal propagates in the neighbourhood of the reference position and unknown position; and
use (S240) the direction of propagation and the result of the comparison to assist in the calculation of the unknown position relative to the reference position.

16. The portable electronic device of claim 15, further comprising a satellite positioning receiver (1230), wherein
the satellite positioning receiver is adapted to determine the reference position when satellite reception is strong, and
the processor (1220) is adapted to use the direction of propagation and result of the comparison to assist in the calculation of the unknown position when satellite reception is weak.

* * * * *